United States Patent
Bagants et al.

(10) Patent No.: US 12,461,916 B2
(45) Date of Patent: Nov. 4, 2025

(54) SYSTEM AND METHOD FOR REPOSITORY MANAGEMENT

(71) Applicant: JFrog Ltd., Netanya (IL)

(72) Inventors: Shay Bagants, Kfar Yona (IL); Yinon Avraham, Kibbutz Dalia (IL); Zohar Sacks, Kfar Saba (IL); Ori Yafe, Tel Aviv (IL)

(73) Assignee: JFROG LTD., Netanya (IL)

( * ) Notice: Subject to any disclaimer, the term of this patent is extended or adjusted under 35 U.S.C. 154(b) by 0 days.

(21) Appl. No.: 19/201,966

(22) Filed: May 8, 2025

(65) Prior Publication Data

US 2025/0272295 A1    Aug. 28, 2025

Related U.S. Application Data

(63) Continuation of application No. 18/941,751, filed on Nov. 8, 2024.

(60) Provisional application No. 63/627,329, filed on Jan. 31, 2024, provisional application No. 63/599,706, filed on Nov. 16, 2023.

(51) Int. Cl.
    *G06F 16/2455*    (2019.01)
    *G06F 21/62*      (2013.01)

(52) U.S. Cl.
    CPC .... *G06F 16/24556* (2019.01); *G06F 21/6218* (2013.01)

(58) Field of Classification Search
    None
    See application file for complete search history.

(56) References Cited

U.S. PATENT DOCUMENTS

2003/0046282 A1    3/2003  Carlson et al.
2017/0084273 A1*   3/2017  Zohar ............... G10L 15/26

* cited by examiner

*Primary Examiner* — Brandon Hoffman
(74) *Attorney, Agent, or Firm* — PEARL COHEN ZEDEK LATZER BARATZ LLP

(57) ABSTRACT

A system and method for managing repositories may include or involve aggregating a plurality of repositories, where each repository may include data elements of a computer model, determining a state for the computer model, and fetching one or more of the data elements based on the determined state. In some embodiments, aggregated repositories may include at least two or more of: a remote repository, and a local repository—and the aggregating may include associating a single address with data elements from different repositories. In some embodiments, determining a state for the model may include comparing a stored version of the model to a reference version of the model using, e.g.: a checksum operation, a model commit, and/or a hash function. Some embodiments may include managing repositories based on a repository layout, which may describe a hierarchy between model data elements and/or aggregated repositories.

18 Claims, 8 Drawing Sheets

SYSTEM AND METHOD FOR REPOSITORY MANAGEMENT

PRIOR APPLICATION DATA

The present application claims benefit from prior U.S. application Ser. No. 18/941,751, filed on Nov. 8, 2024, and entitled "SYSTEM AND METHOD FOR REPOSITORY MANAGEMENT", which claims benefit from prior U.S. Provisional Application 63/627,329, filed on Jan. 31, 2024, and entitled "SYSTEM AND METHOD FOR REPOSITORY MANAGEMENT", and from prior U.S. Provisional Application 63/599,706, filed on Nov. 16, 2023, and entitled "SYSTEM AND METHOD FOR REPOSITORY MANAGEMENT", all are incorporated by reference herein in their entirety.

FIELD OF THE INVENTION

The present invention relates generally to managing data repositories, and more specifically to managing online repositories for computer models.

BACKGROUND OF THE INVENTION

Online repositories have become linchpins in the digital age, transcending various domains and disciplines. These repositories may serve as virtual libraries, meticulously organizing and cataloging vast collections of datasets and data items, code segments or computer programs, and the like.

Recent advancements in online repository technology have enabled sophisticated repository platforms that not only to host or catalogue an extensive array of data elements and resources but also incorporate advanced features to enhance user experience and collaboration, including for example code scanning and testing capabilities, advanced search and tagging functionalities, and so forth.

Specific, dedicated repositories for hosting and managing computer models (such as, e.g., machine learning or artificial intelligence models of various types) are needed, e.g., in response to the growing demand for efficient knowledge sharing and collaborative innovation within the machine learning community, as well as for providing model data items or elements to a plurality of client systems or platforms in a consistent and robust manner. There is a need for a centralized framework or platform that may house or manage a diverse array of machine learning models, datasets, and associated resources—which may pave the way towards an accelerated model development and efficient management of models' usage and lifecycles.

SUMMARY

Embodiments may manage or maintain repositories and/or the lifecycles of machine learning models, which may include or involve, for example, aggregating a plurality of repositories, where each repository may include data elements of a computer model, determining a state for the computer model, and fetching one or more of the data elements based on the determined state.

In some embodiments, aggregated repositories may include, e.g., at least two or more of: a remote repository, and/or a local repository—and the aggregating may include associating a single address with data elements from different repositories.

In some embodiments, determining a state for the model may include comparing a stored version of the model to a reference version of the model using, e.g.: a checksum operation, a model commit, and/or a hash function.

Some embodiments may include managing repositories based on a repository layout, which may describe a hierarchy between model data elements and/or aggregated repositories, and may, e.g., contribute to distinguishing between model data element types (i.e. model artifacts, datasets, code artifacts, metadata artifacts etc.), and/or to grouping artifacts under common namespace for visibility, searches, permission management and the like.

Some embodiments may include storing or caching data elements based on a plurality of rules.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

Figure 1:
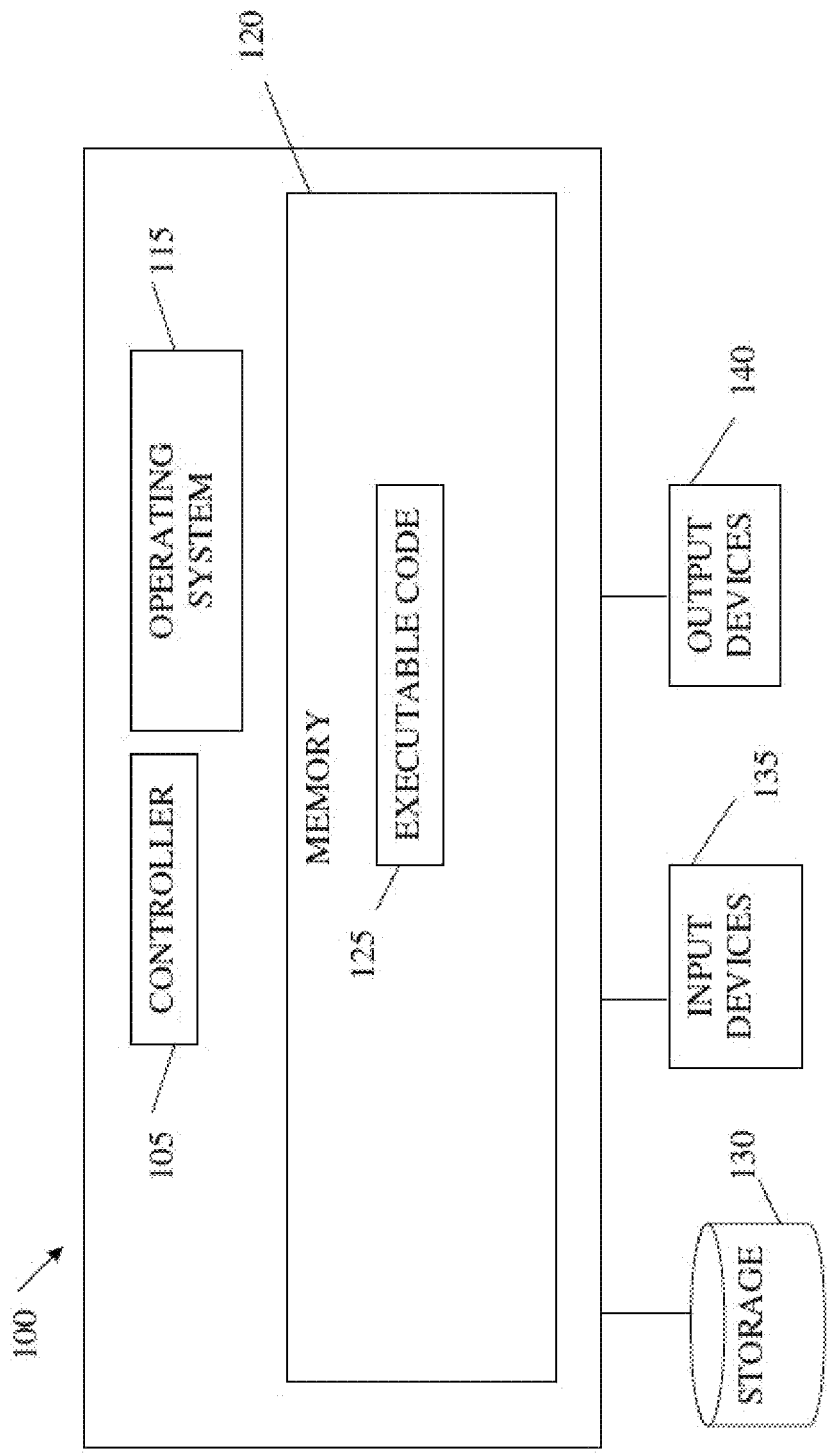
FIG. 1 is a high-level block diagram of an exemplary computing device which may be used with embodiments of the present invention.

FIG. 1 shows a high-level block diagram of an exemplary computing device which may be used with embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or data such as low-level action data, output data, etc.

Executable code 125 may be any application, program, process, task, or script. Executable code 125 may be executed by controller 105 possibly under control of operating system 115. For example, executable code 125 may be or execute one or more applications performing methods as disclosed herein. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods and procedures disclosed herein. For caching and/or storing, some embodiments may use or include external, e.g., cloud storage components such as for example the Amazon web services (AWS) S3 storage component, an object-based storage device or service, filesystem data storage, and the like, which may for example be used to store binaries and/or various model artifacts. Additional or alternative components may be used in different embodiments.

Embodiments of the invention may provide a system and method for constructing and managing or maintaining repositories for computational models, and/or for model management and model lifecycle management. Models or artificial intelligence related artifacts managed by different embodiments of the invention may include for example machine learning models and/or artificial neural networks (e.g., deep neural networks, convolutional neural networks, and the like), as well as training data and information items used by these models, although additional or alternative models may be used or included in different embodiments.

A repository for models according to embodiments of the invention may be referred to herein as model repositories. In some embodiments of the invention, repositories may comprise, e.g., a plurality of model data elements of a computer model such as for example described herein (and/or additional or alternative artificial intelligence related artifacts, such as training datasets, and more).

In some embodiments of the invention, models may include a plurality of components and/or files in different formats such as for example further illustrated herein, although additional or alternative example elements or items may be realized.

In some embodiments of the invention, managing the lifecycle of a model in a repository may correspond to and/or may include or involve overseeing parts or the entire journey of a machine learning model, from its initial development and deployment to subsequent updating iterations, improvements, and eventual retirement. The process may encompass various stages, starting, e.g., with the collection or organization and/or processing of relevant datasets, followed by the training and validation of the model. Following training and/or validation, a model may be deployed and integrated into applications or systems (such as for example a computer software program). Continuous monitoring and evaluation of model updates and/or versions may be crucial to assess its performance in real-world scenarios. As new data becomes available or the model encounters novel challenges, repositories may facilitate retraining and updates to enhance its capabilities. Throughout the model's lifecycle, documentation, version control, and collaboration mechanisms may be vital—for example to ensure transparency, reproducibility, and effective communication among contributors. Finally, when a model becomes (e.g. has a state of) obsolete or is replaced by a superior version, proper retirement procedures may be needed (to prevent, for example, by appropriate security measures a leakage of sensitive data). Managing the lifecycle of a model in a repository according to some embodiments of the invention may thus ensure a systematic, well-documented, and integrative approach to machine learning model development and maintenance.

A model version or a "version" (e.g., of an artificial intelligence related artifact and/or a dataset) as referred to herein may be or may include a plurality of files or collections of data, which may be referred to herein as data or information elements/items, or as model elements or data elements—which may be for example various components necessary to reproduce and deploy a given computer model, such as an NN. Model elements or items may be in a form other than files, and may be for example individual parameters. The exact contents may vary depending on the practices followed by the development and deployment processes. However, in some embodiments, a model version and/or corresponding model data elements may be or may include, for example:

Architecture: specification, description, or definitions of the model's structure, including, e.g., the type of neural network layers, their configurations, and connectivity between different components of layers.

Model weights and parameters: learned weights, biases, and other parameters that may be adjusted during the training phase and are essential for making predictions.

Hyperparameters: settings and configurations may define the model's behavior but are not learned during training. Examples may include learning rates, batch sizes, optimization algorithms, and so forth.

Codebase: source code or script which may be used to implement and/or train the model. This may include, e.g., preprocessing steps, data loading, and any custom functions or modules.

Dependencies: software libraries, frameworks, and versions which may be required to run or use the model successfully. This may help ensure reproducibility across different environments. In some embodiments, this may include, e.g., environmental information (relating, e.g., to environments in which relevant models may be expected to operate), such as, e.g., integrated development environment (IDE) or a Python version, operating system information, hosting container/computer resource information and the like. Additional information and environmental parameters may be realized.

Documentation: additional documentation which may describe the purpose of the model, its intended use, and any specific instructions for training, inference, or deployment.

Metadata: additional data or information items or elements describing, e.g., datasets used for training, the date of creation, the author, and the like.

Evaluation metrics: results from the model evaluation process, which may include, e.g., performance on validation and test datasets. This may help assess the model's quality and effectiveness.

Training logs: records of training processes, including, e.g., loss curves, accuracy trends, and other relevant information that helps understand the model's training history.

It should be noted that additional or alternative items, elements, and components may be included in model versions managed by different embodiments of the invention.

"Versioning" as used herein may for example refer to a systematic management and tracking of changes made to data elements and/or files, or to a set or collection of elements or files, for example in the context of machine learning models and associated code. Versioning may be essential to maintain a detailed history of modifications, enabling to understand the evolution of a model, track improvements, and revert to previous or historical states if necessary. Version control or version management systems may be employed to implement versioning in online repositories. They may create a timeline of changes, which may in some embodiments be referred to as a commit history, where each commit represents a specific "snapshot" of the model and its associated code and/or files and/or data or information items at a particular point in time. Such meticulous recording of changes may enhance collaboration, as multiple contributors may work on the same project simultaneously without fear of conflicting alterations. Versioning according to some embodiments of the invention may be crucial for reproducibility and ensuring the integrity of machine learning models within online repositories.

"Retraining" as used herein may refer to, e.g., the updating and/or enhancing an existing model's performance by incorporating new data or making modifications to its architecture. This process may be essential, e.g., when the relevant model encounters novel patterns or trends that were not adequately represented in its initial training dataset. Retraining may help the model adapt to evolving circumstances, by ensuring it remains relevant and effective over time. The procedure may involve feeding the new data and/or information items into the existing model, fine-tuning its parameters, and sometimes adjusting the model's structure—through techniques such as for example transfer learning or incremental learning (additional or alternative techniques may be used in different embodiments of the invention). Retraining may prove particularly crucial in dynamic environments where the data distribution may change, and the model needs to continuously learn and improve its predictive capabilities (e.g., in cases involving concept and/or data drift). A process of retraining (which may be, e.g., iterative and/or incremental) may thus prove fundamental to maintaining the accuracy and relevance of machine learning models in various real-world applications.

"Proxying" as used herein may, e.g., refer to the practice of creating a representative or substitute model that may stand in for an original version of a model, for example during certain stages of development or deployment. In some embodiments of the invention, a proxy model may for example may be used or employed to simulate real-world conditions, conduct testing, or validate changes without directly affecting the primary model in production. Proxying may thus enable to assess the potential impact of modifications, updates, or new data on the model's performance before implementing them in a live environment. Such a procedure may for example help mitigate risks, ensure a smoother transition between model versions, and may contribute to the overall stability and reliability of a machine learning model throughout its lifecycle. In some embodiments of the invention, proxying may include or involve using a single address or platform (having, e.g., a single uniform resource locator or URL, or communicating with different parties using an intermediary platform specifying relevant URL or URLs) for multiple repositories, which may allow fetching or providing data from multiple proxied sources while communicating with one address and/or server only to control the corresponding data, process, URLs, access control, and the like, such as for example discussed herein.

"Caching" as used herein may for example refer to a strategic storage of, e.g., frequently accessed or requested data and/or model versions in a data store (e.g. a cache) which is faster or provides faster access then data storage otherwise to be used for the data—allowing for example to optimize performance and reduce computational overhead. By storing computations, results, or entire models in a cache (instead of, for example, just on the remote source and/or repository), subsequent requests may and/or model management actions may be taken or fulfilled more quickly, which may, e.g., enhance or improve the efficiency of a given model's lifecycle (including, e.g., model training, validation, and deployment processes).

Caching may prove particularly beneficial when dealing with large datasets or complex model architectures—as it may minimize redundant computations and may accelerate the retrieval of information. Such a practice may contribute to smoother workflows, shorter response times, removing dependencies on the relevant remote source (which may no longer be exclusively responsible for storing and/or managing the relevant items), and improved overall efficiency within the lifecycle management of machine learning models in repositories according to some embodiments of the invention. In some embodiments, to "cache" and/or "model caching", may refer to and/or include storing model and/or data items or elements (such as for example model binaries) in computer storage or memory, and creating a link or representation of the stored elements under the remote repository's "cache" hierarchy, such that for example a client requesting model items or elements may request, be exposed to, and/or have access to a cached model such as, e.g., "repository-cache/my-model/my-version/model.pkl" on the server.

In some embodiments, cache memory may for example be included in model store 220 and may be or may include CPU or GPU cache units and/or for example memory units different from, e.g., memory or storage units included for model data 206. In one nonlimiting example, model store 220 may be or may include, for example, a small-sized type of volatile computer memory that may provide high-speed data access to a processor, such as for example level 3 (L3) used by some modern processors, such as for example Intel's Core i7 or AMD's Ryzen series (in this example L3 cache is a larger, shared cache found between the individual processor cores, which may provide quick access to frequently used data and program instructions, e.g., in order to enhance enhancing overall system performance). Model data 206, on the other hand, may be or may include a slower type of memory, such as for example a hard disk drive or solid state drive (SSD) such as for example the Samsung 970 EVO SSD. Additional or alternative cache memory and/or storage types, as well as different memory or storage usage strategies, may be used in different embodiments of the invention.

In addition, some repositories according to some embodiments of the invention may distinguish between content considered as fixed/unchanged to a content which may change in the future (e.g., a "dynamic version") and decide whether to store or re-store newer version of it (which may depend on various parameters such as for example remote source, repository layout or settings conventions, standards, and the like), such as for example described herein. Some embodiments may store (or temporarily cache) binaries and/or metadata, such as creation/modification date, the last time it was verified that there is no newer version of this model (e.g., a timestamp describing the last communication with a relevant remote source), "cache item unfound" responses, "server unavailable" responses, and additional or alternative data or information items as, for example, fields or records in in relevant databases or data stores such as for example described herein.

Some embodiments may detect or identify that content, such as, e.g., a model data element of a set of elements, may change in the future for example based on the relevant branch or tag for a given model version. In one example, a model client may upload, update or store a model version on the server and specify or mark this version as a "dynamic version" (see further discussion here). In such manner, embodiments may identify some or all of the elements included in the dynamic version as prone to change in the future. Additional or alternative settings, as well as conditions or criteria may be used for determining that a given model, version, file or element may change in the future—such as for example if the number of changes made to a given version or branch exceed a predetermined threshold for a predetermined time period (for example—versions associated with a given branch have been changed more than five time in the last ten days). Additional or alternative examples may be realized and used in different embodiments.

A "branch" as used herein may refer to, e.g., a line of model and/or data or information item versions, which may be independent from, or parallel to, other branches. A model branch according to some embodiments may include, for example, specific versions or variations of machine learning models (e.g., including different model parameters resulting from different training cycles or iterations) which may be different from versions included in a different branch. Creating a model branch according to some embodiments of the invention may include or involve making or creating a copy of an existing model or its codebase, and changing or updating this copy to create different model versions. Model branches may be particularly useful, for example, when testing different hyperparameters, architectures, or training strategies, as they provide a controlled environment for experimentation.

In some embodiments of the invention, once changes in a model branch are validated and are approved or deemed successful or desirable, they can be merged back into the main model or designated branch.

A model artifact as used herein may refer to, e.g., an output or result of a model training process that may encapsulate the knowledge and/or parameters learned by a machine learning model. An artifact may take various forms, such as a trained model file, a set of weights and biases, or any other serialized representation of a model's structure and/or parameters. In some embodiments, model artifacts may represent the tangible outcome of the training phase and may be used for making predictions by a given model on new, previously unseen data.

Previous systems and methods for repository management do not provide lifecycle management capabilities specifically suited for machine learning and other types of computer models, including model related artifacts, or adequately address models' specific lifecycle including, e.g., versioning, retraining, and/or related operations. Embodiments of the invention improve existing methods and technologies by providing a model-centered framework which allows managing the storing and/or versioning and/or retraining of computer models and/or model artifacts in an optimized, computationally efficient manner—thus ensuring model integrity, e.g., for a great variety of real world applications of machine learning models.

Embodiments of the invention may manage and secure the entire flow of model files, data items, or components, including ones flowing into a given system or server from external sources. Some embodiments may perform various automated actions or operations, including for example security and licensing scanning, security analysis, access and permission management, and the like, to manage models efficiently and effectively while taking security factors (e.g., ones relevant to model or model related files or data items) into account.

Embodiments of the invention may provide methods to manage models and/or model lifecycle, including, for example:
- A hybrid server which may host models in repositories where users may decide whether to host and fetch or provide models in a server managed by themselves, or to use a third party server as service, or to use a combination of both.
- Supporting project and repository separation or division (which may, in some nonlimiting examples, support efficient collaboration and/or promote efficiency among, e.g., different teams, groups, projects, applications, and the like. Other examples for functionalities associated with repository separation or division may be realized).

Supporting or providing advanced permission management and authentication management capabilities. These are required to ensure the model management is following the organization standard, where the repository server authentication and permission management can be integrated with the organization authentication and authorization systems.

Supporting or providing a plurality cache promotion mechanism or mechanisms, which may include, for example, copying stored or cached items into a different repository (e.g., from a remote repository into a local repository, for example in the case of a hybrid and/or virtual repository such as for example described herein), and/or to "promoting" or changing a state of a model or version, and/or of data items or elements, e.g., to enable effective deployment (for example, a model may be promoted from a state, status, or tag of "experimental models" to that of "promoted models" which may for example be deployed in a relevant environment in multiple phases throughout a given model's lifecycle).

Supporting or providing efficient optimization of memory or storage resources that may reduce the occupied storage used for hosting models and model artifacts.

Supporting or providing proxying and caching capabilities for models and model artifacts from remote servers, including optimization for renewing cached model versions, and/or for calls or communications with the remote server, and the like.

Supporting or providing smart aggregation of multiple model repositories and the repositories content in a single uniform resource locator (URL) address, which may simplify client configurations and/or control over different model clients and/or accesses.

Supporting or providing advanced model scanning capabilities, with their artifacts and/or dependencies, advanced security and licensing policy management, which may allow, e.g., to prevent the exposure of content which may be vulnerable to security issues, or preventing the using of incompatible licenses.

Supporting or providing model curation capabilities, which may include, e.g. a gate to control and manage policies which may control, e.g., what models may be permitted to be exported to externally managed repositories.

Supporting or providing dedicated techniques and/or procedures for model versioning, and/or cleanups.

While unaddressed by alternative solutions, embodiments of the invention may improve present technologies by addressing key challenges in model and/or repository management relating to, e.g., content, file or data management and control, access management, security, report and/or data availability, backup and file history, content synchronization across multiple sites or computer systems, and additional or alternative capabilities needed for managing or maintaining models and/or repositories.

Embodiments of the invention may provide a model and/or repository management framework which may be used, for example, to organize and manage a plurality of models or repositories; to support a plurality of model clients which may download and upload models; to proxy and cache models from external sources; to manage model versions and/or cleanups; and to secure and manage security or access policies such as for example further described herein.

Figure 2:
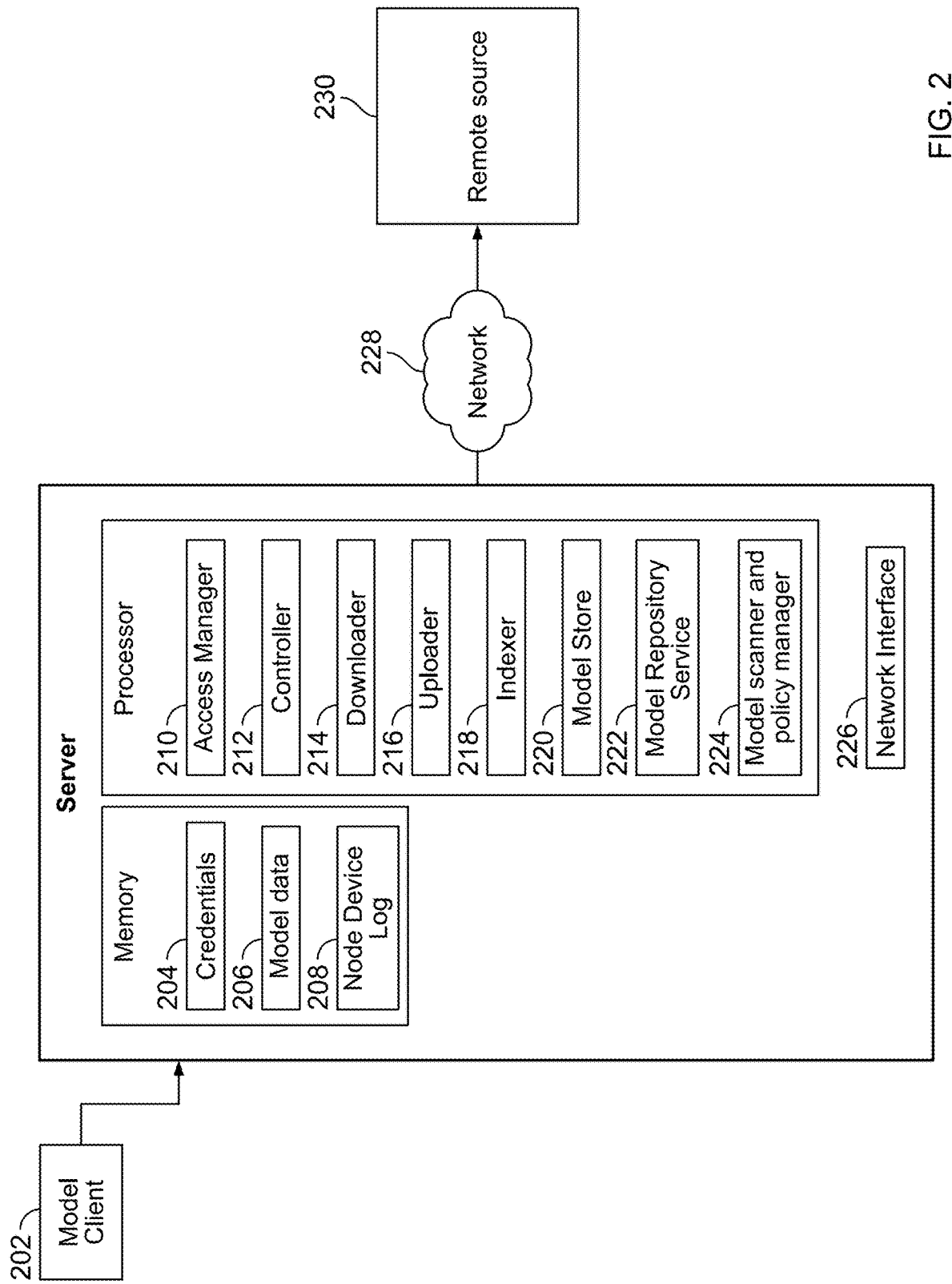
FIG. 2 is a block diagram of an example model management system according to some embodiments of the invention.

FIG. 2 is a block diagram of an example model management system according to some embodiments of the invention.

Some embodiments may include the model management system, including the different components or modules discussed herein (and/or additional or alternative components or modules)—on a dedicated server (and may be referred to herein simply as "the server"). The server may be remotely connected, e.g., via a communication or data network, to a plurality of additional computer systems which may be involved in, or take part in, model management protocols and procedures such as for example described herein. It should be noted that in some embodiments of the invention the server and/or repositories may include or involve containers and/or a virtual server, docker container, and the like. Additional or alternative components may be used in different embodiments.

Model client 202 may be for example a computer system used for downloading, and/or uploading models or model-related files and data items to a management system according to some embodiments of the invention. Client 202 may be used to perform additional operations on the model and the model data. In some embodiments, client 202 may be operated by a user and/or may be remotely connected to the server via a communication network such as for example described herein. It should be noted that additional or alternative computer systems unlimited to model clients may be remotely connected to, and communicate with, the server in different embodiments of the invention.

Credentials 204 may include or store one or more user access credentials which may, e.g., be used for various model access operations, permission validation, and security operations relating, e.g., to client 202 and/or to requests or commands received by relevant clients or systems.

Model data 206 may include or store model data or information items, and/or model metadata items in computer storage or memory. In some embodiments of the invention, model data or metadata items or elements stored in this component may be or may include, e.g.:

Collecting all model versions and storing/maintaining a "latest" model, so clients may request a model, for example, without specifying a particular version and receive the last or most recent version.

Depending on the model or item type, automatically extracting available model metadata such as the author, tags, modification date, model language, model version, originated commits, and more—and store these as searchable properties, which may later on be searched by, e.g., a user using a dedicated application programming interface (API) and/or query language (QL), and the like.

A metadata service may normalize the structure of files to a custom "package" structure, which later on may be used with a structure different from a simple list of files (in some nonlimiting examples, descriptors/manifests may be included to describe package contents such as, e.g., files & metadata).

Items, elements, or files that a client or user may "see" or may be exposed to may be records in a database which may point to binaries which may, e.g., be included in model store 220.

Node device log 208 may include the application log to track or monitor executed actions and/or data flows, such as for example model access requests and/or usage. A nonlimiting example log or log file format may be, e.g.:

*X1.log*

```
2024-01-22T21:07:05.747Z [1ebf493203de6bba] [ACCEPTED LOGIN] for client : admin / 192.168.65.1 [token]
2024-01-22T21:07:07.137Z [315b5620d23eeca2] [ACCEPTED DEPLOY] {$REPO}:models/{$MODEL_NAMESPACE}/${MODEL_NAME}/main/2023-10-12T03:34:16.000Z/tokenizer.json for client : admin / 192.168.65.1 [token]
2024-01-22T21:07:07.139Z [315b5620d23eeca2] [ACCEPTED DOWNLOAD] {$REPO}:models/{$MODEL_NAMESPACE}/${MODEL_NAME}/main/2023-10-12T03:34:16.000Z/tokenizer.json for client : admin / 192.168.65.1 [token]
```

*X2.log*

```
2024-01-22T21:07:06.833Z [jfrt ] [INFO ] [315b5620d23eeca2] [o.a.r.HttpRepo:464 ] [http-nio-8081-exec-7] - {$REPO} downloading https://${REMOTE_SERVER_HOST}/{$model_namespace}/${model_name}/resolve/.../tokenizer.json 428.83 KB
2024-01-22T21:07:07.138Z [jfrt ] [INFO ] [315b5620d23eeca2] [o.a.r.HttpRepo:477 ] [http-nio-8081-exec-7] - {$REPO} downloaded https://${REMOTE_SERVER_HOST}/{$model_namespace}/${model_name}/resolve/.../tokenizer.json 428.83 KB at 1,403.57 KB/sec
```

*X3.log*

```
2024-01-22T21:07:05.747Z|1ebf493203de6bba|192.168.65.1|admin|GET|/api/${DEDICATED_API}/{$REPO}/api/models/{$MODEL_NAMESPACE}/${MODEL_NAME}/revision/main|200|-1|0|975|unknown/None; ${CLIENT_NAME}/${CLIENT_VERSION}; python/3.11.7;...
2024-01-22T21:07:07.141Z|315b5620d23eeca2|192.168.65.1|admin|HEAD|/api/${DEDICATED_API}/{$REPO}/{$MODEL_NAMESPACE}/${MODEL_NAME}/resolve/.../tokenizer.json|200|-1|439124|762|unknown/None; ${CLIENT_NAME}/${CLIENT_VERSION}; python/3.11.7;...
```

Although additional or alternative formats may be realized.

Access manager 210 may manage client access, e.g., based on stored credentials 204.

Controller 212 may receive, handle, or intercept incoming model requests or commands (e.g., from client 202). In some embodiments, controller 212 may convert or redirect a payload address from the received request or command to a different payload address which may be used by the server and/or model management system or platform and its internal structure. This may be useful, for example, in contexts where client 202 may be agnostic to repository layout or structure, e.g., in the context of a hybrid repository such as for example described herein. Controller 212 may send the received request and/or data to further processing, e.g., following the converting or redirecting of a payload address.

Downloader 214 may download relevant models, and/or manage the download and cache flow and processing operations such as for example described herein. In some embodiments, downloading may be or may include receiving a download command or request (e.g., from a user or client such as for example further discussed herein) and executing or satisfying the request, for example by downloading and storing models in server storage or memory, and managing the download request flow such as for example illustrated herein.

Uploader 216 may be used to upload relevant models to model store 220, and manage the upload flow and processing operations such as for example described herein.

Indexer 218 may extract model data or metadata and update relevant model data or information items in relevant storing components.

Model store 220 may hold or store, cached model data items such as for example binaries such as for example further described herein. In some embodiments, model store 220 may be responsible for storing binary content, while model data 206 may store extracted metadata which may reference or point to these binaries (which may include, e.g., locations, hierarchy, what a client or user may be exposed to and may attempt to access), such as for example further described herein. Additional or alternative memory or storage divisions and layouts may be used in different embodiments.

Model repository service 222 may store and/or manage repository configurations or layouts such as for example described herein.

Model scanner and policy manager 224 may be responsible for security, licensing, scanning and/or policy management operations relating to model data items or files managed according to some embodiments of the invention.

Network interface 226 may include a transmitter, a receiver, or a combination thereof (e.g., transceiver), and may be for example a NIC such as for example described with regard to FIG. 1 herein.

Network 228 may include any type of communication network, such as a direct PC-to-PC connection, a wide area connection (WAN), a local area connection (LAN), and/or additional or alternative network configurations as known in the art.

Remote source 230 may be for example a remote computer system (e.g., geographically separated from the dedicated server, and for example connected to the server via a communication or data network) or server from which a given model may be downloaded or proxied, or which may contain a reference version of the model which may be managed, for example, using the protocols and procedures described herein.

It should be noted that additional or alternative modules and/or components may be included or used in different embodiments of the invention.

A remote repository or model remote repository as used herein may refer to a repository that proxies and/or caches models and/or related information items from an external resource, such as for example a remote server or a remote storage.

Some embodiments of the invention may allow creating a remote repository or plurality of remote repositories, where a given repository may proxy a single external server, or a plurality of servers. In some embodiments, the remote repository may be found and/or managed on the server including the model management system and/or component such as for example described herein.

Embodiments of the invention may include determining or computing a state for the computer model, or for a version of a model, and fetching or providing model versions and/or data items or elements based on the determined state. A state may be a description of the model, such as of the model's status. In some embodiments, determining or computing a state may correspond to determining or computing whether a version of the model or of the relevant data item has expired, marking a version as valid, and the like, such as for example described herein. In some embodiments of the invention, the determining of a state, and/or the state itself (e.g., valid, expired, unavailable, nonexistent, and the like, such as for example described herein) may be an artifact or result calculated or determined as part of the model management protocols and procedures further described herein, and may accordingly determine or denote automated actions or process workflows that should be taken with regard to the model or version (for example, a version may be determined to have the state "valid", and may therefore be fetched or provided to a given model client—for example in subsequent steps of a corresponding management workflow or process such as, e.g., described herein; another version may be determined as having the state "expired" and may not be provided, and a different, valid version may be fetched or provided instead, and so forth, such as for example described herein). Additional or alternative states and relevant formats (including, e.g., documentation in relevant database entries) may be included in different embodiments of the invention.

Figure 3:
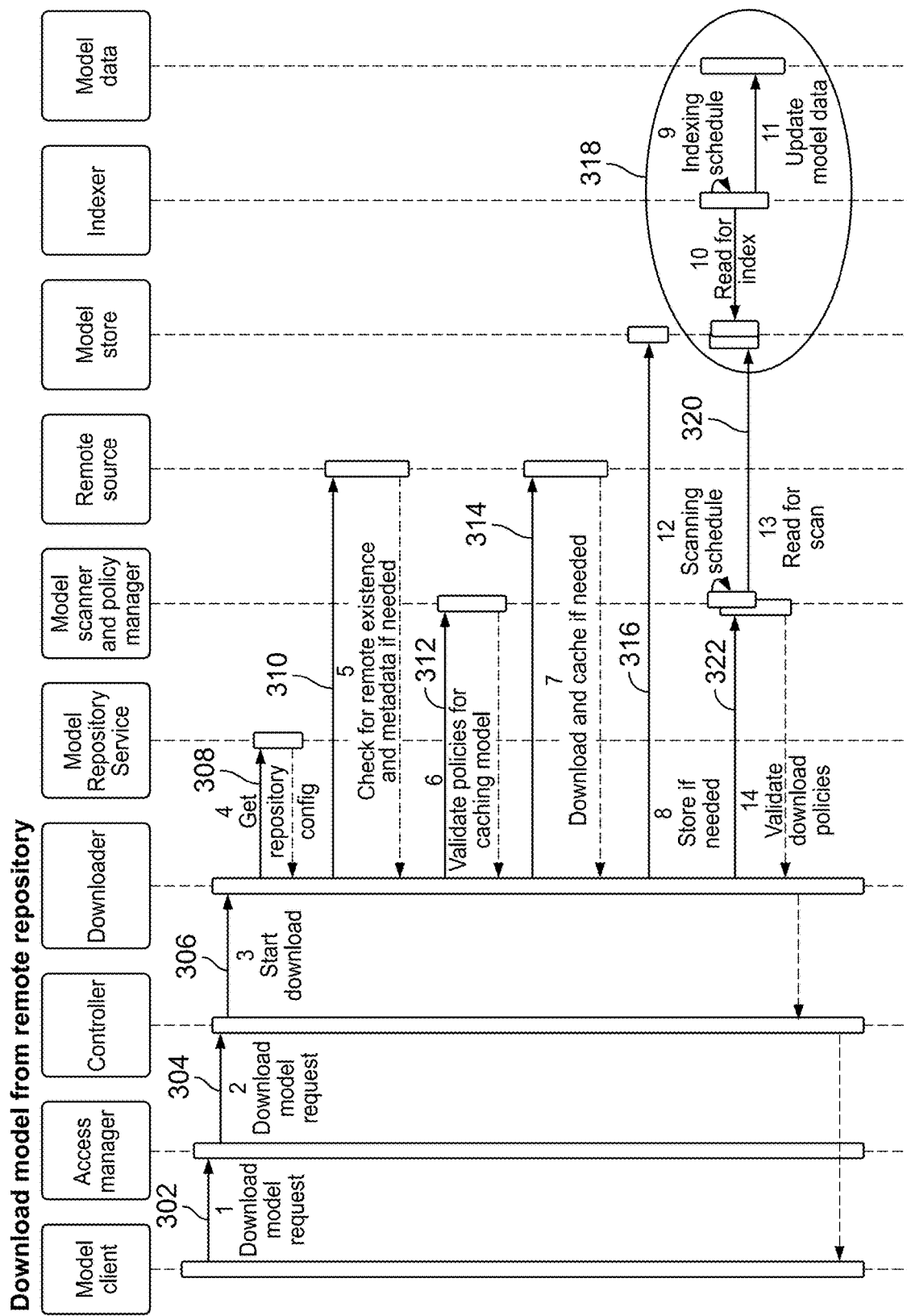
FIG. 3 shows an example process for managing a model from a remote repository according to some embodiments of the invention.

FIG. 3 shows an example process for managing a model from a remote repository according to some embodiments of the invention.

A model client (which may be for example a computer system such as, e.g., described herein) may interact or communicate with the remote repository (or with a local or a virtual repository), and for example to download and upload models' data or information items, and/or use appropriate software and/or network interfaces to manage the models. In some embodiments, such a process may begin by the client sending a request to the server. In one nonlimiting example, an interaction between a client and the server may be or may include, e.g.:

A model client may request a model using, e.g., the following command:

S_shot_download(repo_id="$model_name", etag_timeout=1500000000)

A specific version and/or branch and/or tag, and the like may be requested by the relevant client, e.g., by including or specifying relevant parameters such as for example ""main", "${hash}", "$ {tag}", "${branch}" and the like.

The server may receive the request or command by the client and may communicate a repository (e.g., a remote repository) to fetch or receive the latest, most recent, or most up to date version (also referred to as snapshot herein) of a given model branch such as, e.g., the "main" branch for the relevant model. This may be done for example using a command such as, e.g. HTTP GET http://localhost:8081/serv/api/ . . . /ml-remote/api/models/${model_name}/revision/main.

The server may respond, for example, using a response structure or format matching or corresponding to a given client's settings, and for example using a corresponding secure hash algorithm (SHA), to specify or provide model filenames and additional metadata. In some embodiments, the SHA returned or provided by the server may be a commit such as for example described herein—which may, e.g., be created and/or further manipulated by the server to correspond or describe a specific version or snapshot of a model at a specific time or timestamp (and thus including or corresponding to unique or "specific" coordinates). An example response to a request as may be provided by the server may be, e.g.:

---

{"_id":"9373911106z712c31214eqpo","id":"${ml-name}","modelId":"${ml-name}","author":"...","sha":"a1eb76a55339d95bb5a6e76ca42edf1e2080e654","disabled":"false","downloads":100000,"likes":0,"pipeline_tag":"text-classification","tags":["text-classification",],"config":{"architectures":["XSequenceClassification"],"model_type":"${type}"},"transformersInfo":{"processor":"AutoTokenizer","auto_model":"XSequenceClassification","pipeline_tag":"text-classification"},"cardData":{"language":["en"],"tags":["sentiment"],]},"siblings":[{"rfilename":"README.md"},{"rfilename":"config.json"},{"rfilename":"pytorch_model.bin"},],"lastModified":"2023-01-01T00:12:21.000Z","private":false}

---

The client may trigger the downloading of the files described by or included in SHA, which the server may accordingly (e.g., automatically) translate, group, or package as a corresponding "version". The server may identify the SHA in the download request and/or use an existing map between "hash" and a version (which may include or be based on a date/time for a specific version), which may be stored in the server's memory or storage.

The server may map the request and the triggering command by the relevant client, which may be documented in a corresponding log file or entry in the server's memory or storage such as for example:

2024-01-22T22:20:19.361Z [a616c3c29bb7d2e0] [ACCEPTED DOWNLOAD] hf-remote:models/${ml-name}/main/2023-05-03T00:39:47.000Z/config.json for client : admin / 192.168.65.1 [token]

In some embodiments of the invention, requests or commands by, e.g., relevant model clients and/or the server may be for example URL commands. Additional or alternative requests or commands and/or corresponding formats may be used in different embodiments.

Embodiments may cache a model if missing (e.g., locally from a remote source), and manage, or provide cached and/or stored models such as for example described herein. In some embodiments, the server may include or may use an optimized checksum-based storage—in which contents and/or files, items, or elements (such as for example model binary files) may be stored only once (e.g., in model store 220 or in filesystem storage) while references to this file or element may be stored separately (e.g., in model data 206, or a separate database). In one nonlimiting example use case, a single item, element or file may be uploaded once to the server and/or the relevant repository, but saved or stored twice in different locations and, e.g., using different naming conventions, coordinates or hierarchy such as for example "repo-a/myfile.tgz" and "repo-b/a/b/anotherfile.tgz". In such case, the server may store the file or content only once (e.g., in model store 220 using a SHA1 hash) but create two references in model data 206 (which may be or may include a corresponding address or reference database) for these two different names/coordinates. In such manner, the relevant client requesting or accessing the model may "see" both coordinates in a corresponding API or UI, while being agnostic the two coordinates refer to the same reference file or data element. Such an example use case may apply, e.g., when proxying models from a remote repository.

In some embodiments, caching a model if missing may refer to or may include, e.g., the following example steps:

A client or user may request a model, e.g., by specifying a model name, version, or coordinates (such as for example described herein).

The server may first identify the hashes of the requested files (such as for example using a mapping and/or table such as for example demonstrated herein), and if the binary content is not already stored, The server may fetch and/or store the binary in model store 220.

If the relevant content is already stored (e.g., from a previous storing process according to the procedures described herein) but the coordinates (model name, tag, branch, and the like) are not yet stored in model data 206 (e.g., a corresponding database), the server may store a reference or link, or a second reference or link, to the already existing model binary, file, or element.

Additional or alternative model and/or reference caching or storing procedures may be used in different embodiments.

In some embodiments, the server may accept a download request from model client 202 (step 302).

Some embodiments may validate or authenticate the relevant user or client 202 using, for example, access manager 210 (step 304). In some embodiments, validation or authentication may include, e.g., using and/or validating API keys such as for example known in the art, although additional or alternative techniques and procedures may be used in different embodiments.

Controller 212 may accordingly receive the request, and/or process and route the request to Downloader 214 (step 306).

Downloader 214 may receive the request for a model, model files, or data items which may be found in a specific repository. In some embodiments, downloader 214 may filter out or remove elements, items, or files which the requestor or client may be unentitled or unauthorized to access (such as for example different versions of models, or different aggregated repositories under a virtual repository, e.g., as further described herein).

Downloader 214 may communicate with, or query model repository service or module 222 to receive a plurality of repository configurations, which may be used to interact with remote source 230. Repository configurations as used herein may for example include a URL associated with remote source 230, as well as relevant network settings and/or parameters, authentication details, caching configurations, and the like, such as for example further illustrated herein, although additional or alternative settings and/or fields may be realized (step 308).

In some embodiments, downloader 214 may validate that client 202 is allowed or permitted to perform download operations on the requested resource (e.g., permitted to perform a read operation, e.g., based on permission and of access management operations by relevant components such as, e.g., described herein), and if cache is needed, validate that client 202 has permissions to populate a cache for the model (e.g., permitted to perform a write operation). Some embodiments may identify or detect that "cache is needed", e.g.: if a requested model data element or item is not stored in model store 220, and/or if coordinates, references, or links are not stored in model data 206, and/or if a request for an expired dynamic version is received, and a newer version exists, e.g., in the relevant remote source. Embodiments may thus detect that cache may be needed and accordingly cache and/or store relevant model data elements or items, as well as links or references to these items, such as for example described herein.

Downloader 214 may check the requested model and its files exist in remote source 230 and may fetch or provide relevant information and/or metadata items such as for example provided and/or illustrated herein (step 310).

If the model or model files are not found, downloader 214 may mark and cache the missing state (such as, e.g., further described herein) for a predefined, configurable period of time (which may be referred to, e.g., as "repository missed retrieval" period. In some embodiments, this period may be adjusted for example based on user preferences and may amount, e.g., to 5 hours, 3 days, 3 months, and the like).

In a case where downloader 214 identifies that remote source 230 is unavailable or that communication with it is unstable, it may mark or recognize remote source 230 as offline and only fetch or provide models (e.g., for satisfying the received request) from the remote repository cache for a predefined, configurable period of time (which may be referred to as an "assume offline" period and may be adjusted, e.g., similarly to the repository missed retrieval period)—e.g., while monitoring the availability of remote source 230 and/or the relevant files in remote source 230 periodically (e.g., to check if connectivity may be restored).

If the model exists or is found in remote source 230 (e.g., given a stable connection to remote source 230), downloader 214 may query model scanner and policy manager 224 to validate whether the specific model or model content does not violate a plurality of policies before caching it (step 312). In some embodiments, relevant policies may be predetermined or predefined, e.g., by a user and include e.g., as allowed licenses, security violations and the like. In some embodiments, different policies and/or security rules may be applied to different versions of a given model and/or model related data or information items.

In some embodiments of the invention, a fetching or providing of model data elements may include caching model data elements or model versions, where cached elements may be or may include a model binary file. For example, if the model, model version, and/or data elements are not violating relevant policies, downloader 214 may cache the files, e.g., as a binary or binaries (step 314) in model store 220 (step 316)—and may create a version (for example, automatically) of the model which may represent or describe the current list of files that were requested and/or cached (and/or generally fetched or associated or linked with requested model data elements) are available in remote source 230 as a unique version in the repository.

In some embodiments, if one or more of the model files already exists in model store 220 under different coordinates (such as, e.g., associated with a different repository, name, version), downloader 214 may use the content from model store 220 instead of downloading these files from remote source 230 and/or locate them on a newly created version or coordinates in the remote repository cache. In some embodiments of the invention, this may include:

Downloader 214 may query the model information using a dedicated API in remote source 230, and may store its response as a file, which may considered as a leading file and may for example specify an expiration date or time for the model, or a time where the state of a model, version, or element are to be determined expired (such as e.g., further described herein). In some embodiments, a leading file may be or may include a model data element or item that represents a version or package, and/or a list of files in the model, their checksums and the like. In one example, model information received, e.g., from a remote source or server in response to a corresponding request and/or query (such as for example described herein) may be stored and considered as a "leading file" for the relevant model version and/or corresponding data elements or items.

Downloader 214 may check for etag header for the remote file or API response and may search the already existing content in model store 220 and/or in model data 206, e.g., to avoid transferring content in the network if it already exists locally.

In some embodiments, downloader 214 may detect or identify that a model or data element or item exists under different coordinates by, e.g., querying the remote server to get or fetch file information first. The remote server may then return hashes representing the requested files (i.e. SHA1, SHA2, and the like) which may be associated with a particular element or item at a specific time period, such as for example described herein. Downloader 214 may then query relevant databases (e.g., in model data 206) for example to check if there is a record of this binary already in the system or in a relevant repository and may filter out items or elements only associated with references that the relevant client has no permissions for. Downloader 214 may also further query or check relevant access permissions for a given client and accordingly continue the fetching, sending, or transmitting data elements or items to that client, such as for example further described herein.

Once the model and its file/s are stored, indexer 218 may read and index the model (steps 318). In some embodiments, indexing operations may be triggered or performed, e.g., according to a predetermined and/or configurable schedule or period (similarly, for example, to the various configurable time periods discussed herein).

In some embodiments of the invention, indexing of a model may include, e.g., storing model information or metadata items downloaded from remote source 230, e.g., after being enriched with additional data provided by indexer 218, and extracted model metadata in model data 206, which may later be used by downloader 214 and other components, for example in the context of searching (for example by a user or client 202) or querying for past models or model versions, and/or related operations such as, e.g., past or historical cleanups, scans, searches, and the like (step 320).

Once the model and its files are stored, model scanner 224 may trigger a model security scanning process, which may include or involve, for example, storing the model with a unique identifier which may include the model's name, version, hashes, owner, and the like. Data enriched by the scanner may include data with extracted licenses and matching security issues and may be stored in model store 220. In some embodiments, scanning operations may be triggered or performed, e.g., according to a predetermined and/or configurable schedule or period (similarly, for example, to the various configurable time periods discussed herein).

In some embodiments, fetching or providing model data elements, e.g., to a given model client, may include or involve transmitting the relevant model data elements to the model client (which, as noted herein, may be a remote computer (e.g., geographically separated from the server), or a computer remotely connected to the server considered herein) over a communication or data network. Various network communication protocols and procedures are known in the art and may be used as part of a transmission of data elements according to different embodiments of the invention. In one example, downloader 214 may validate or check download policies relating to cached and/or stored and/or scanned models or model files (step 322). If the relevant models do not violate relevant policies or access conditions or criteria, downloader 214 may provide the relevant files to controller 212, which may in turn send or transmit them to user or client 202.

It should be noted that additional or alternative workflows and/or steps may be included in different embodiments of the invention.

In some embodiments of the invention, the determining or computing of a state for model data elements may include: if data elements are cached for more than a predefined time period, expiring the relevant data elements or marking them as expired (e.g., determining their state as expired), and if data elements are not cached for more than a predefined time period, then determining their state as valid (and, e.g., fetching or providing them to a relevant model client). Accordingly, fetching of model data elements may include, in some embodiments, replacing or updating expired data elements with new data elements (which may for example be further stored in the server's storage or memory). For example, some embodiments may expire and cache a newer model, for example if the relevant model has newer contents (such as newer files or data items) in remote source 230.

As part of an example such process, upon passing or satisfying initial validations Downloader 214 may receive a request for a model or file/s in a specific remote repository (such as, e.g., described herein).

Downloader 214 may then use the specific repository configurations and may validate that the client is allowed to perform download operations on the requested resource (such as, e.g., described herein).

Downloader 214 may then check or identify if the requested version of the model is a "dynamic" version. A dynamic version as used herein may refer to a version that one or more of its files (or an API representation of relevant files) are marked or determined to be prone to changes or updates in the remote repository. In some embodiments this may include, e.g. downloader 214 checking or identifying whether a given model client requested a model branch, model tag or commit (see further corresponding discussions herein). Downloader 214 may for example identify the branch or tag as models that their content might change from time to time in remote source 230 and address them as a dynamic version of a single model. In some embodiments, Downloader 214 may check or search cached files to check for model expiration properties.

In this context, downloader 214 may evaluate, for example:

- Whether the model is requested to be re-cached due to changes by a relevant client (which may include performing permission validations to ensure whether a relevant client has proper permissions to perform write operations in the repository).
- Whether the requested model is cached in the remote repository cache for a period that exceeded the pre-defined expiration threshold criteria and considered in an "expired" state based on a predetermined time period (which may be referred to as Metadata Retrieval Cache Period) according to, e.g., the repository configurations in model repository service 222, or whether a request by a client or user to recache (which may also be referred to as "zap cache") has been received.
- Whether remote source 230 is not considered unavailable, which may for example be determined using a configurable, predetermined time period (which may be referred to as an "Assumed Offline Period"), for example as part of the relevant repository's configurations.
- Whether there were no recent requests by downloader 214 to remote source 230 that were returned with a "NOT FOUND" alert (as, e.g., cached or documented in the server).

If some or all of the above are true, the relevant model version may be considered expired, or in an expired state, by some embodiments of the invention. Otherwise, the model or relevant data elements may not be considered expired.

If the model or a model version is considered expired, and/or if the repository is accessible and if there no cached state or version missing, downloader 214 may evaluate whether the requested model version has changed (e.g., based on comparing cached file changes, new files, deleted files, and the like to files and/or data or information items on remote source 230)—e.g., if a stored or cached model version mismatches a reference (e.g., latest) version found in remote source 230.

For example, in some embodiments, if the previous dynamic version of the model which was cached, or some versions were cached as a dedicated dynamic version (e.g., if a model branch of a model "main" cached as "main/$unique_version" in the repository; different example paths may be used in different embodiments), downloader 214 may take the latest cached unique version of the dynamic version and compare it against the model information, e.g., as provided in an API of remote source 230 (which may be for example an API of a model source such as for example the Hugging Face platform; additional or alternative sources or platforms may be used in different embodiments).

In some embodiments, the determining or computing of a state for a model, model version, or data item or element may include comparing a stored version (of, e.g., a model) to a reference version using checksum, commit, and/or hash function related operations. For example, downloader 214 may use different methods or procedures, e.g., to identify version changes which may include operations such as for example checksums, etag, commits, hashes, dates, file names among others and compare model versions to cached content and metadata.

A checksum as used herein may referred to, e.g., a cryptographic hash function generated from the content of a file or a set of files. In one example, it may correspond to a fixed-size string of characters that may serve as a unique identifier for the content or file it represents. A checksum may be computed using a dedicated algorithm such as for example SHA-256, and even a small change in the relevant content or file may result in a vastly different checksum or output. In some embodiments of the invention, if checksum values for two versions of a model match, the matching may indicate that no changes occurred or may distinguish between the two versions.

An etag as used herein may be, e.g., a hypertext transfer protocol (HTTP) header that may represent a unique identifier associated with a specific version of a resource. In some embodiments, when a model and/or file or data item is updated, its etag may change, which may allow to track changes in models or files. In some embodiments, an etag may be a hash value or function, and/or a commit or value uniquely representing a data item or element.

A commit as used herein may be a representation of changes made to a file, or to set of files or data items, or of a file or item (or a plurality of such) at a specific time period. In some embodiments, a commit may include a unique identifier (usually a hash) that may represent the state of the files at a specific point in time. Similarly to, e.g., etags, commits may be compared to track changes in models or files according to some embodiments of the invention.

In some embodiments, hashes may be generated using a dedicated hash algorithm such as for example the SHA-1 algorithm, although additional or alternative algorithms and procedures may be used for generating, for example, distinct identifiers (e.g., as part of commits) for different file or model versions based on their contents in different embodiments of the invention.

Additional or alternative identifiers, and/or file or version comparing related operations may be included in different embodiments, depending for example on different pre-defined or configurable settings included in remote source 230.

Some embodiments of the invention may include preventing the comparing of the stored version to a reference version of the model—for example if the reference version of the model is unavailable over a predetermined time period. For example, in a case where downloader 214 identifies no changes and/or that no relevant model version (e.g., a recently used version) is missing, downloader 214 may mark the cached version as valid or determined the state of the cached version to be valid and may update its cache or the cached version so no subsequent (e.g., redundant or wasteful) checks for version expirations may take place until another cache expiration period (as may be defined or set by Metadata Retrieval Cache Period) will be exceeded. A similar procedure may be used, e.g., in a case where remote source 230 is recognized or marked as unavailable such as for example described herein.

If downloader 214 identifies changes between relevant versions of the model, it may use the fetched information to fetch or reuse relevant content, and/or model data of information items and/or to include them in a new (e.g., unique) model version. An example model content or data fetching and storing process may include, e.g.:

If the content of one or more of the requested files in remote source 230 are newer than the cached version, but already exist in model store 220 under different coordinates (such as under a different repository, name, version), downloader 214 may use the content from its own storage for the new model version instead of downloading these files from remote source 230.

For content which may not yet be available in model store 220, downloader 214 may fetch and store the content in model store 220.

Downloader 214 may mark the new version as a valid version, or determine its state as valid, and will only renew (re-check for newer content of the model files) when it expires (e.g., based on or asset by Metadata Retrieval Cache Period, such as for example further described herein).

Embodiments may fetch or provide models from cache if remote source 230 is unavailable.

For example, if a version was requested from the remote repository while the remote source 230 is unavailable, and if the version was already cached, downloader 214 may fetch or provide the cached version, even if the version is considered as expired. In some embodiments, this may include performing required validations, such as for example included in policies, access permissions, and the like, as for example discussed herein with regard to corresponding system components.

Embodiments may manage a local repository which may be used for storing models uploaded by user and/or copied from other repositories—and for downloading models, while, e.g., supporting model versioning, model cleanup, permission management, model scanning, permissions, policies, and the like.

A local repository as used herein may refer to a copy of a reference repository that may be stored on a separate computer system (e.g., a specific model client, a personal user's machine, and the like). For example, when a developer starts working on a project, they may clone or initialize a local repository on their computer. The local repository may contain or document the entire version history of the project and may allow a developer or client to make changes, create new model branches, and commit modifications without immediately affecting the reference, "main" or remote repository (which may be shared among multiple model clients).

Some embodiments of the invention may include uploading models, model versions, and/or data elements to a plurality of repositories or repository types (such as, e.g., a virtual repository including a plurality of aggregated or connected repositories) based on a repository layout or configurations, where the layout may describe a hierarchy between model data elements and/or components.

Figure 4:
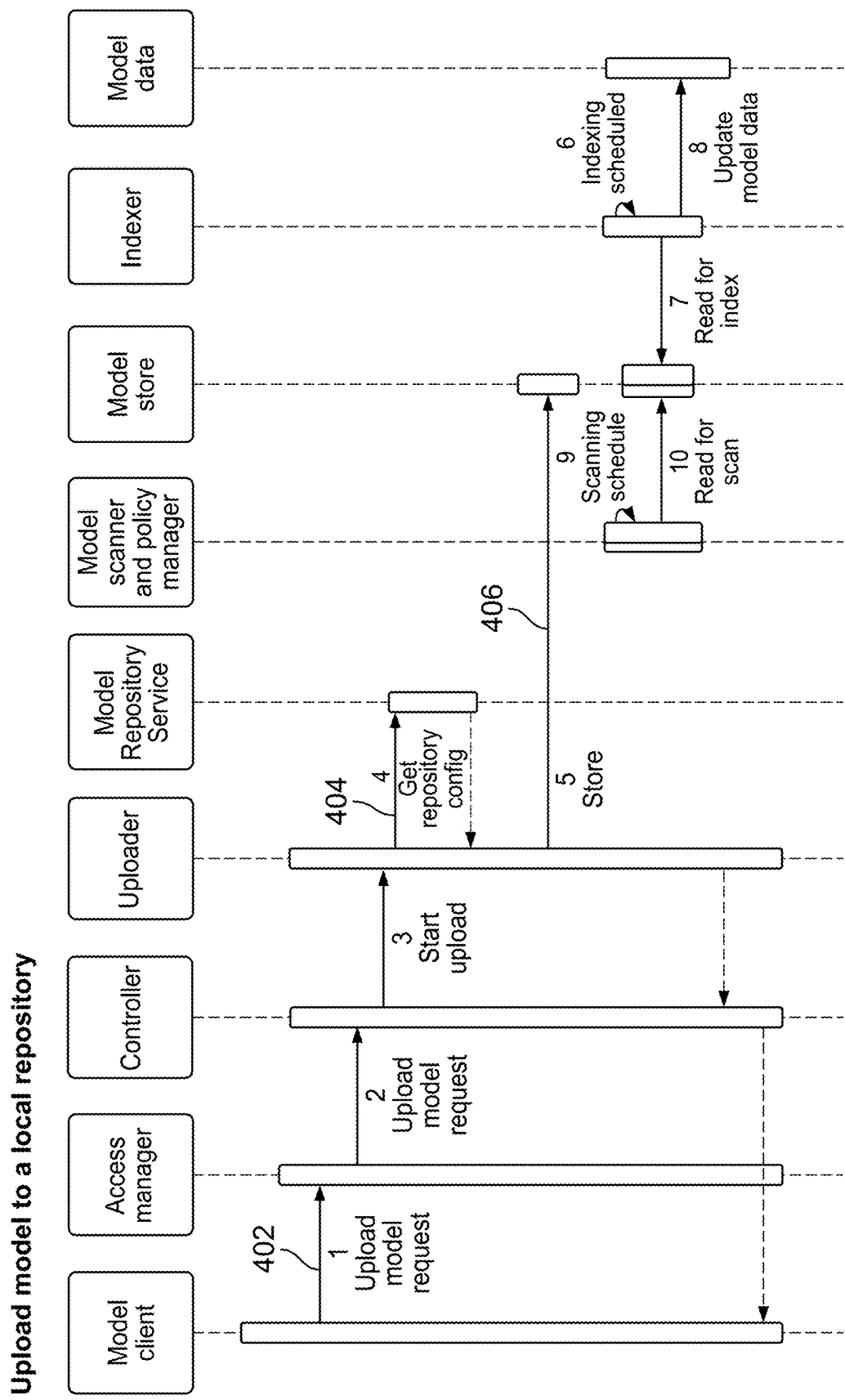
FIG. 4 shows an example process for uploading a model to a local repository according to some embodiments of the invention.

FIG. 4 shows an example process for uploading a model to a local repository according to some embodiments of the invention.

In some embodiments, the server may receive an upload request for a model (e.g., from a user or client 202), which may include or involve a plurality of model files (step 402).

Access and permissions validations may be performed by embodiments of the invention, such as for example further described herein.

Uploader 216 may use or check the repository configurations, which may include for example, a repository layout, a cleanup strategy to store and manage the uploaded models, and so forth, which may be for example received from model repository service 222 (step 404). A repository layout may be a configuration that specifies the hierarchy among tokens/regexp within the repository, which may be constructed for example by a computer system of the model owner, and which may address, inter alia, file name, versions, releases/tags e.g., for integration or development versions.

In some embodiments, a model may be requested to be uploaded with a specified version, or without a version. For example, a user or client may specify a model's name or title, without requesting a specific "version", while a "version" may be or may refer to a tag, commit, branch, and the like. A nonlimiting download specification of a model without a version may be, e.g.: "*s_shot_download (repo_id="<MODEL_NAME>")*" which may be automatically translated or converted by embodiments of the invention to requesting a version on the "main" branch, e.g. "*snapshot_download(repo_id="<MODEL_NAME>", revision="<COMMIT/BRANCH/TAG/V ERSION>")*. Similar references or specifications may be used, e.g., in uploading and/or downloading model items or elements. Additional or alternative example use cases may be realized.

Uploader 216 may identify the requested version (e.g., based on differences from previous versions to ones already stored in the relevant repository, and using protocols and procedures such as for example described herein and involving, e.g., checksums, commits, and the like), and may accordingly store or cache it. Some embodiments may distinguish between stable versions, such as release versions, "dev"/experimental versions where for example a specific version may not be specified or requested, and versions that match a specific token/regular expression included in the repository layout (step 406).

Similarly to managing or maintaining remote cached models by embodiments of the invention (see discussion herein), once the model is stored in model store 220, the indexer may index the uploaded model, and the scanners may scan it such as for example further discussed herein.

In some embodiments, the local repository may be configured and used for cleanup model versions, for example based on the model repository layouts, which may include or involve various operations such as for example automatic cleanups and/or retaining or discarding of old versions, such as e.g. "dev"/experimental versions (which may be, e.g., temporary versions which should not be shared and/or merged with other versions on of the model stored using various systems components such as for example described herein).

Figure 5:
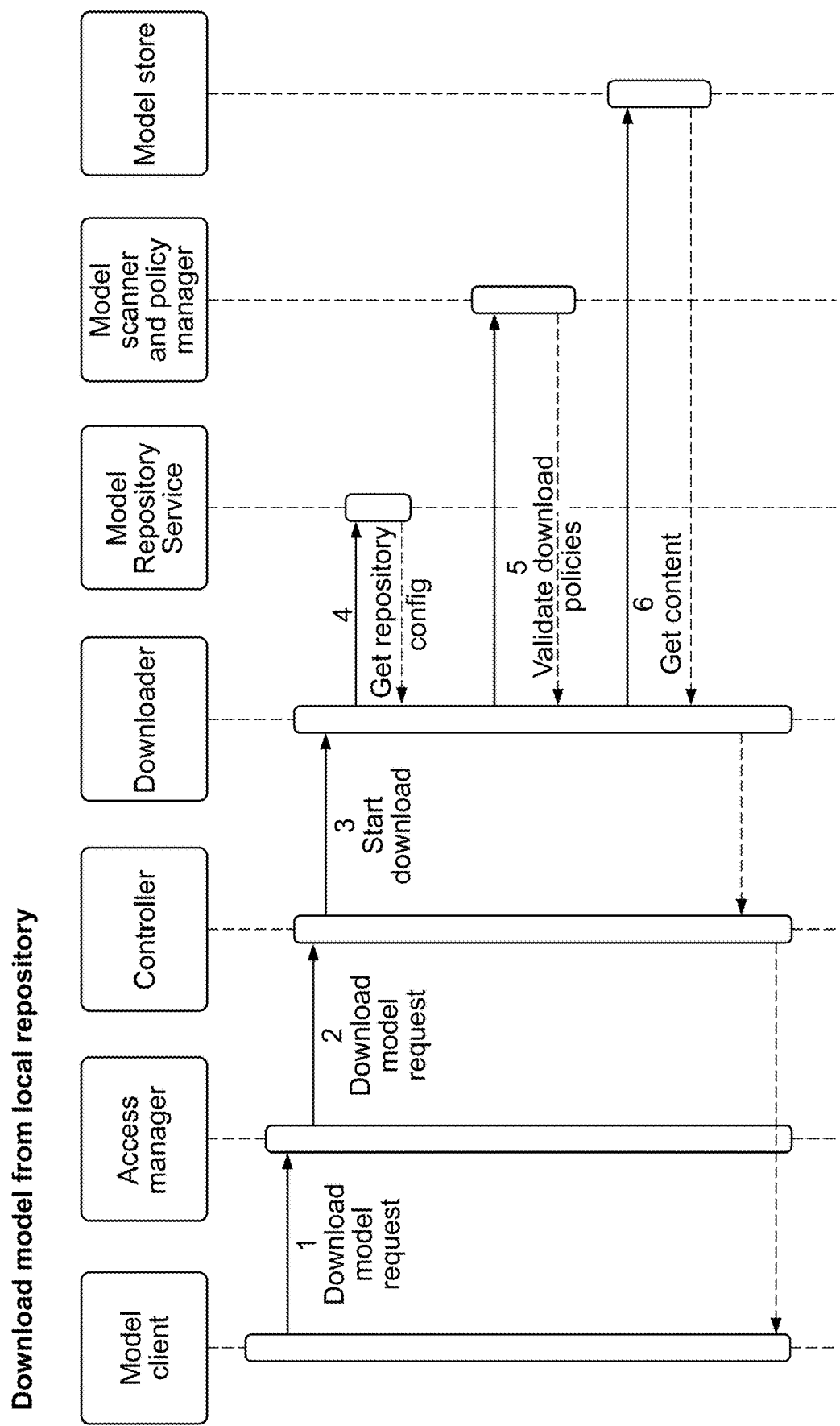
FIG. 5 shows an example process for downloading a model from a local repository according to some embodiments of the invention.

FIG. 5 shows an example process for downloading a model from a local repository according to some embodiments of the invention.

In some embodiments, the download flow or the downloading of a model from a local repository may be similar to, or include similar operations to downloading model from a remote repository cache. In one example, as in a case when the cached version is not expired (see discussion herein), the model or model files or data items may be provided from a storing component such as, e.g., model store 220 (see, e.g., discussion various discussions provided herein).

Some embodiments of the invention may allow managing models using a virtual repository, which may allow aggregating or connecting multiple repositories in a single repository and a single URL which may be exposed to the end user or model client.

Some embodiments of the invention may include connecting or aggregating a plurality of repositories into a single virtual repository. In some nonlimiting example cases, repositories aggregated into a virtual repository may be or may include: a plurality of remote repositories, and a plurality of local repositories. In some embodiments, the aggregating of repositories may include associating or linking a single address (e.g., a URL address) with a plurality of data elements from the plurality of repositories considered (for example: associating a single URL address with at least one model data element or item from a first repository and at least one model data element or item from a second repository) and/or with a plurality of repositories and/or computer systems (which, e.g., may be physically separated and connected over a data or communication network). In one example, embodiments may aggregate at least two repositories into a single repository, including at least one remote repository and at least one local repository (or, e.g., at least two of: a remote repository, and a local repository)—although many different combinations may be realized in different embodiments.

In some embodiments, the aggregating or the assembling a virtual repository may include, for example, creating or generating a virtual repository configuration, which may include or involve a list of aggregated repositories or of a plurality of repositories to be aggregated, an order and/or priority resolution and other settings to control and/or restrict requesting specific items or elements from outside specific repositories, and relating for example to which repositories among the repositories aggregated under the virtual repository may be accessed or considered before other repositories.

In some embodiments, when a model client requests content (e.g., model data element, item, or file) from a virtual repository, a nonlimiting example flow that may be executed may be, e.g.: the virtual repository may receive or intercept the request and execute the request using all aggregated repositories under the relevant URL. The virtual repository may expose or include the contents (e.g., models, model versions, data items or elements) based on predefined cached index, or on-demand, and the implementation of executing the request based on aggregated data may be or may include, e.g.: listing all model/model versions from all aggregated repositories, and, e.g., fetching relevant items from all listed items. In some embodiments, a similar flow may be used or be executed upon receiving a request to download, search, call and/or upload (where an upload may be mapped to the relevant location where content may be stored, e.g. based on the virtual repository configurations), which may be similarly sent by a remote computer such as e.g. a model client. Additional or alternative requests and execution operations may be realized. In some embodiments, listed results may be filtered according to user permissions (e.g., if a given user has access to some, but not to all, aggregated repositories as further described herein), and "latest" and other dynamic versions may be set or determined dynamically based on, or according to, the relevant user permissions.

Virtual repositories may also be configured with default repositories for upload, leading clients to work against a single repository while being agnostic to additional repositories aggregated in the virtual repository. In some embodiments, the virtual repository and its specific configurations and/or layout may be set or configured ahead of time and prior to aggregation of particular, constituent repositories—which may be performed for example by system and/or project administrators.

Embodiments may provide or include a download process flow from a virtual repository. Similarly to the other repositories or repository types considered herein, once initial validations are performed and/or passed, downloader 214 may start processing the relevant request (e.g., for a given model version) and may fetch or query, e.g., virtual repository configurations, which may include, for example, the list of aggregated repositories included in the virtual repository—as which may include a hierarchical priority sequence or resolution among aggregated repositories such as, e.g., illustrated herein—as well as additional configurations such as for example described herein.

Downloader 214 may search the relevant requested model among the aggregated repositories, which may include for example searching according to a predefined order—such as, e.g., searching in local repositories first, then, in remote cache, and last, remote source.

If the user request refers to a dynamic version, or requests the "latest" version available, the virtual repository may merge metadata from the aggregated repositories, or may use cached merged repositories and corresponding data or metadata and use it to choose the suitable version to return the user, which may be for example, the latest version by date as may be found in all aggregated repositories (in this context, the server may for example list all model or model versions in a plurality of aggregated repositories and expose some or all of them in a single URL, either for listing, or to determine the "latest" among different versions which may be found across some or all of the multiple aggregated repositories).

In some embodiments, fetching model versions and/or data elements may include omitting data elements based on access permissions corresponding to at least one repository. For example, a virtual repository may address or process the user permissions while returning the results, and may be configured by default to return only relevant results, such as if a given user or client 202 has permissions on 3 out of 6 aggregated repositories (or some coordinates in the repositories) and the user requests the latest version, it may get the latest out of the 3 repositories/coordinates he may have permissions to read from, and not receive versions and/or files he does not have access permissions to.

Embodiments may provide or include an upload process flow from a virtual repository.

In some embodiments, the virtual repository configuration may specify a default local repository used for storing models when a client uploads the model to the virtual repository. The upload process itself may then be similar to the one in the local repository.

Additional or alternative download or upload process workflows to and from virtual repositories, including different operations, may be included in or used by different embodiments of the invention, Embodiments of the invention may include or provide model scanning capabilities, such as for example security and licensing scanning.

In some embodiments, model scanning results may be attached or linked to the model and be stored in the platform or server, for example in model scanner 224 module, which may include, for example, a dedicated storage component. Security policies and/or watches may be created on various different tiers or levels, such as, e.g., on a global/project level, on a repository level, or on a file/data item level. Policies may include various automated actions such as, e.g., blocking or disabling access to unscanned models or items, blocking access to models with security issues, blocking access to models with licenses incompatible to a given policy, and the like.

Model scanner 224 may scan a given model given a caching or storing event, or a triggering event (e.g., a read or write operation performed on the relevant item), where scanners may scan relevant models for vulnerabilities, malicious code, security issues and licensing issues.

Embodiments may include or use different and/or multiple types of model scanners, such as for example ones supporting relevant libraries.

Figure 6:
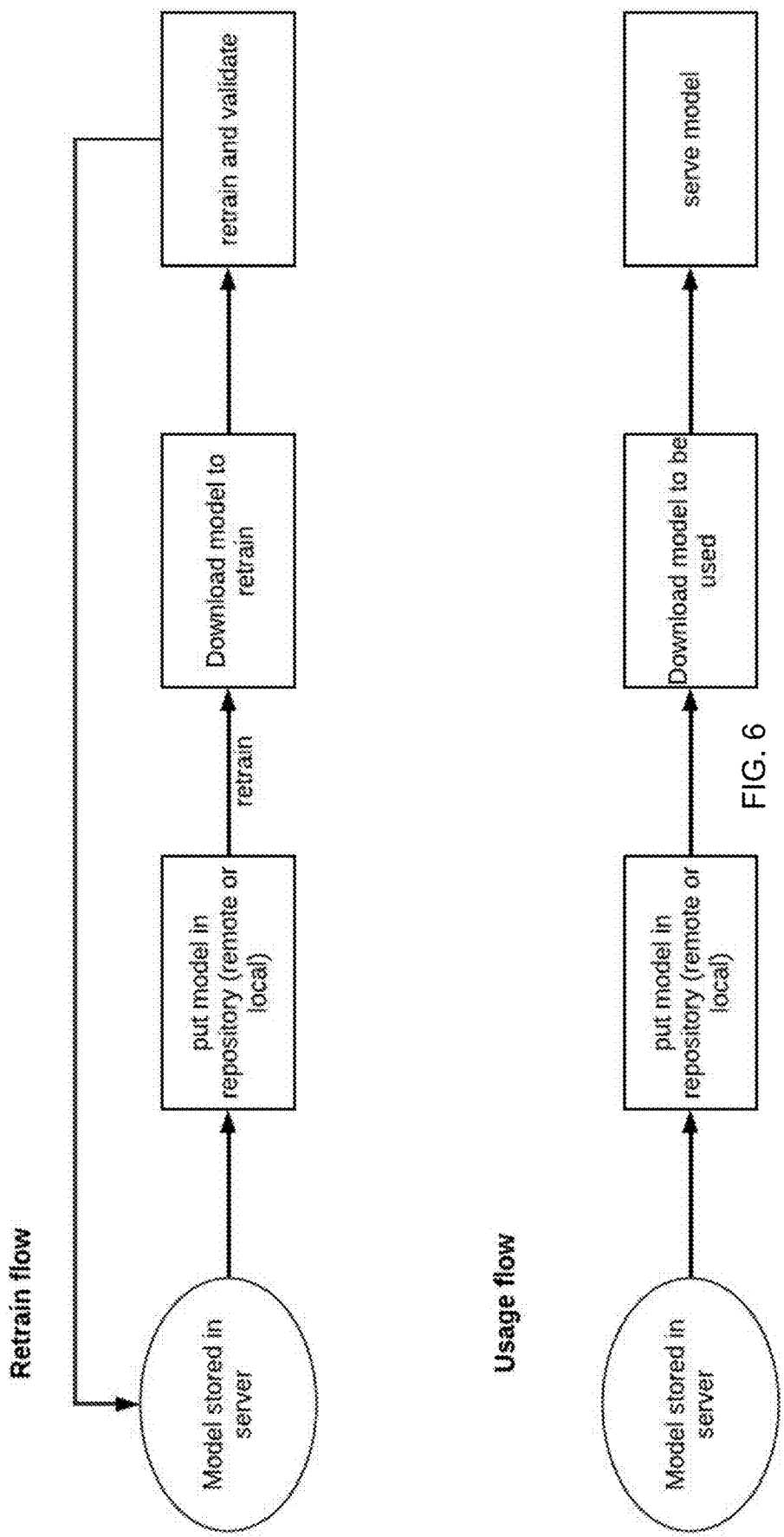
FIG. 6 shows an example process for model retraining and usage according to some embodiments of the invention.

FIG. 6 shows an example process for model retraining and usage according to some embodiments of the invention. In this example, the server may include, store, or host a given model or a plurality of models in a corresponding repository or repositories. The repository or repositories may be managed by the server, for example, such that a given model client may for example store or cache a model version, download a version, retrain a model or version to change or update model parameters, and upload, store or cache the new, retrained or updated version—e.g., according to the various protocols and procedures (e.g., download/upload flows) described herein. Additional or alternative examples processes, including additional or alternative workflows and/or steps may be included in different embodiments.

Figure 7:
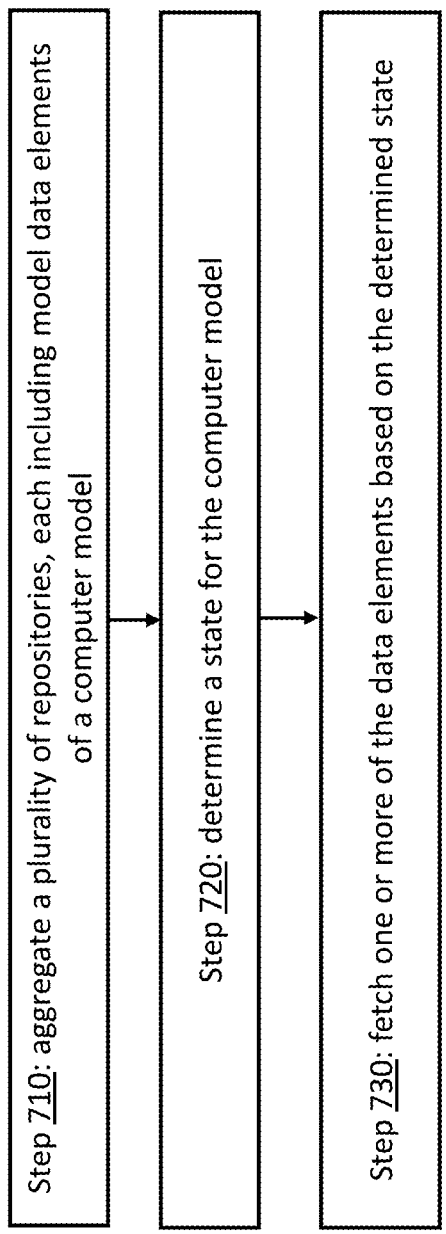
FIG. 7 is a flow diagram of an example method for managing model repositories according to some embodiments of the invention.

FIG. 7 is a flow diagram of an example method for managing model repositories according to some embodiments of the invention. In step 710, embodiments may aggregate a plurality of repositories, where each of the repositories may include a plurality of model data elements of a computer model. Embodiments may then determine a state for the computer model (step 720), and may fetch one or more of the data elements based on the determined state (step 730). Additional or alternative steps and/or operations may be included and/or used in different protocols and procedures according to different embodiments of the invention.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

Some nonlimiting example data structures, tables, files, or configurations (including example file formats and for models and model artifacts, including serialized model, configuration files and the like) that may be used in some embodiments of the invention are provided in Tables 1-4:

TABLE 1

| Filename/type | Description |
| --- | --- |
| .pkl | May be used for object serialization in Python. Used in several machine learning (ML) frameworks such as SKLearn for model persistence. |
| .joblib | May be used for object persistence in Python. Sometimes used for ML model serialization. |
| .keras | May be used for object serialization/archiving by the Keras ML framework. It may include the model's architecture, weights, optimizer, losses and metrics. |
| .safetensors | May be uused for storing tensors safely. |
| .h5 | May be used by the Tensorflow ML framework for model persistence (HDF5) |
| .pb | May be used by the Tensorflow ML framework, may include the complete Tensorflow program, trained parameters, and computation (SavedModel) |
| .onnx | May be used by the ONNX ML framework (Protobuf) |
| .pt/.pth | May be used for storing tensors by the PyTorch ML framework. |
| .bin/.gguf | May be used for quantizing models for fast CPU inference (GGML, GGUF) |
| README.md | Model card readme file |
| added_tokens.json | Additional tokens added to the tokenizer vocabulary |
| config.json | Stored model configuration (for example for training) |
| generation_config.json | Stored model configuration (for example for interference/generation) |
| model-0000x-of-0000y.safetensors | Model checkpoint files (for sharded models) |
| pytorch_model-0000x-of-0000y.bin | Model checkpoint files (for sharded models) |
| model.safetensors.index.json | Map for safetensors sharded model files |
| pytorch_model.bin.index.json | Map for tensors sharded model files |
| specials_tokens_map.json | Map between special tokens and their tokenization information (e.g. string representation, stripping, etc.) |
| tokenizer.json | Tokenizer map (contains string to index, merged characters, etc.) |
| tokenizer.model | Stored tokenizer object file |
| tokenizer_config.json | Stored tokenizer configuration |
| transformers_inference_example.py | Example code for using the model |
| training_args.bin | Stored trainer object arguments |
| trainer_state.json | Stored trainer object state (log history, best model checkpoint, step count, etc.) |

TABLE 2

| Configuration (Remote Repository) | Description |
|---|---|
| Package Type | The technology, package type of the repository |
| Repository Key | The repository key, may be a unique identifier for the repository |
| Environments | May define the environment in which this repository may reside. Environments may aggregate project resources (repositories, pipeline sources, etc.) to simplify their management. |
| URL | The URL for the remote repository, e.g., HTTP and HTTPS URLs |
| User Name | The user name for accessing the URL of the remote repository. May be left blank to access the repository anonymously. |
| Password/Access Token | The password or access token that may be used to access the repository. |
| SSL/TLS Certificate | The certificate that may be used for authentication. |
| Repository Layout | May define the layout used by the remote repository cache for storing and identifying modules, and for advanced features that based on the layouts, such as delete versions, automatic cleanups, capabilities to distinguish between development versions and release versions. |
| Include and Exclude Patterns | May be fields that provide a way to filter out specific repositories when resolving the location of different artifacts, may be used to filter in and filter out artifact queries or results to queries. Filtering may be performed, e.g., by subtracting the excluded patterns (default may be none) from the included patterns (default may be all).<br>Example:<br>Consider that the Include Patterns and Exclude Patterns for a repository are as follows:<br>Include Patterns:<br>org/apache/,com/acme/<br>Exclude Patterns:<br>com/acme/exp-project/<br>In this example, the repository is searched for org/apache/maven/parent/1/1.pom and com/acme/project-x/core/1.0/nit-1.0.jar but not for com/acme/exp-project/core/1.1/san-1.1.jar because com/acme/exp-project/ is specified as an Exclude pattern. |
| Offline | By setting 'offline=true', the repository may be considered offline, and no attempts may be made to fetch remote artifacts from a remote server, only cached artifacts will be served. |
| Enable Indexing | May enable indexing on the repository for security and compliance analysis. |
| Max versions | May specify the maximum number of unique versions of the same artifact that should be stored. Once this number is reached and a new snapshot is uploaded, the oldest stored snapshot may be removed automatically. |
| Proxy | A parameter to select the corresponding Proxy Key. |
| No Proxy | To prevent auto-updates during the edit of system proxies, the flag may be set to false by default-since it turns off the use of a proxy for this repository and prevents proxy updating during system proxy changes. |
| Local Address | A parameter that may enable specifying which specific interface (IP address) should be used to access the remote repository (e.g., in a hybrid repository). This may be used to ensure that access to a given remote repository is not blocked by firewalls or other organizational security systems. |
| Socket Timeout | The time e.g., in ms that the server may wait (for both a socket and a connection) before giving up on an attempt to retrieve an artifact from a remote repository. Upon reaching the specified Socket Timeout the server may register the repository as "assumed offline" for a period of time specified in Assumed Offline Period. |
| Query Params | A custom set of parameters that may automatically be included in all HTTP requests to this remote repository.<br>For example,<br>param1=value1¶m2=vallue2&param3=value3 |
| Lenient Host Authentication | When set, may allow using the repository credentials on any host to which the original request is redirected. |
| Cookie Management | When set, the repository may allow cookie management to work with servers that require them. |
| Unused Artifacts Cleanup Period | Many cached artifacts in remote repository storage may be unused by any current projects by a given client. This parameter specifies how long an unused artifact will be stored before it may be removed. Once reaching this period Artifacts may be removed in the next cleanup. Leaving the field empty (default) means that the artifact is stored indefinitely. |
| Metadata Retrieval Cache Period | May define how long before the server checks for a newer version of a requested artifact in a remote repository.<br>A value of 0 may mean that the server may always check for a newer version.<br>This setting may refer to artifacts that may expire after a period of time (e.g. metadata/indexes and leading files such as, e.g., maven-metadata.xml, npm package.json, Docker manifest.json,model_info.json, and the like). |
| Metadata Retrieval Cache Timeout | May allow to control the metadata timeout performance. If the timeout is reached, the previous metadata may be returned to the clients, as a lock was not applied due to new metadata, which may result in leaving the previous request hanging. The default value is 60 seconds. |
| Assumed Offline Period | In case of a connection error, this parameter may specify how long (e.g., in seconds) The server may wait before attempting an online check to reset the offline status.<br>A value of 0 may mean that the repository is never assumed offline and the server will always attempt to make the connection when demanded. A default value may be 300 seconds. |
| Missed Retrieval Cache Period | If a remote repository is missing a requested artifact, the server may return a "404 Not found" error. This response may be cached for the period of time specified by this parameter. During that time, The server may not issue new requests for the same artifact.<br>A value of 0 may mean that the response is not cached and the server may always issue a new request when demanded. A default value may bbe 1800 seconds. |
| Priority Resolution | Setting Priority Resolution may take precedence over the resolution order, e.g., when resolving virtual repositories. Setting repositories with priority may cause metadata to be merged only from repositories set with this field. If a package is not found in those repositories that have not been set with the Priority Resolution field.<br>This may apply to all repository types excluding some specifics such as, e.g., Chef, CocoaPods, Debian, Git LFS, Opkg, Rust, Vagrant, and VCS repositories. |
| Blacked out | If set, the server may ignore a specified repository when trying to resolve artifacts. The repository may also not be available for download or deployment of artifacts. |

TABLE 2-continued

| Configuration (Remote Repository) | Description |
|---|---|
| Allow content browsing | When set, may allow the server or servers operators to browse the internal contents of archives (for example, browsing specific Javadoc files from within a Javadoc archive). When Allow Content Browsing is enabled, this functionality may restrict access to authenticated users only and is not supported for trial users. This setting may be applied, e.g. to prevent malicious users or systems from uploading content that may compromise security. |
| Store artifacts locally | When set, artifacts from this repository may be cached, and, e.g., stored locally on the server storage. If not set, direct repository-to-client streaming may be used. |
| Synchronize properties | When set, may enable to synchronize properties of artifacts retrieved from a remote instance of the server. |
| Bypass HEAD Requests | When set, the server may not send a HEAD request to the remote resource before, e.g., downloading an artifact for caching |
| Block Mismatching Mime Types | When set, artifacts may not be downloaded if a mismatch is detected between the requested and received mime type, according to a list specified in a system.properties file under, e.g., blockedMismatchingMimeTypes. |
| Override Default Blocked Mime Types | A set of mime types that may override the Block Mismatching Mime Types setting. |
| Propagate Query Params | When set, if query parameters are included in the request to the server, they may be passed on to the remote repository. |
| Enable CDN Download | May enable content delivery network (CDN) download requests to this repository, including, e.g., redirecting the client to download the files directly from a cloud platform such as, e.g., AWS CloudFront or other configured CDN. |

TABLE 3

| Configuration (Local Repository) | Description |
|---|---|
| Package Type | The technology, package type of the repository |
| Repository Key | The repository key, that may be a unique identifier for the repository |
| Environments | May define the environment in which this repository will reside. Environments may aggregate project resources (repositories, Pipeline sources, etc.) to simplify their management. |
| Repository Layout | May define the layout used by the remote repository cache for storing and identifying modules, and for advance features that may be based on the layouts, such as delete versions, automatic cleanups, capabilities to distinguish between development versions and release versions. |
| Include and Exclude Patterns | See nonlimiting example for remote repositories. |
| Enable Indexing | Enables indexing on the repository for security and compliance analysis. |
| Checksum Policy | A checksum may verify the integrity of a deployed resource. The checksum policy may determine how the server may behave when a checksum such as, e.g., a client checksum for a deployed resource is missing or conflicts with a locally calculated |
| Property Sets | May define the property sets that will be available for artifacts stored in the repository. |
| Priority Resolution | Setting Priority Resolution may take precedence over the resolution order when resolving or using virtual repositories. Setting repositories with priority may cause metadata to be merged only from repositories set with this field. If a package is not found in those repositories, the server may merge metadata from the repositories that have not been set with the Priority Resolution field. May apply to all repository types excluding Chef, CocoaPods, Debian, Git LFS, Opkg, Rust, Vagrant, and VCS repository types. |
| Disable Artifact Resolution in Repository | If set, the server may ignore this repository when trying to resolve artifacts. The respository may also not be available for download or deployment of artifacts. |
| Allow Content | See similar example setting/configuration description for a remote repository. When archive browsing is allowed, strict content moderation may be employed to ensure malicious users or systems do not upload content that may compromise security (such as e.g. cross-site scripting attacks) |
| Enable CDN Download | Enabling content delivery network (CDN) download requests to the repository; may redirect the client to download the files directly from a cloud platform such as for example the AWS CloudFront platform. Supported for Enterprise+ and Enterprise Licenses. |

TABLE 4

| Configuration (Virtual Repository) | Description |
|---|---|
| Package Type | The package type may be specified when the repository is created, and once set, may not be changed. |
| Repository Key | The repository key may be a unique identifier for the repository. |
| Environments | May define the environment in which this repository may reside. Environments may aggregate project resources (repositories, pipeline sources, etc.), e.g., to simplify their management. |
| Repository Layout | May set the layout that the repository may use for storing and identifying modules. A recommended layout that corresponds to the package type defined may be suggested. |
| Public Description | A free text field that may describe the repository. |

TABLE 4-continued

| Configuration (Virtual Repository) | Description |
|---|---|
| Internal Description | A free text field to add additional notes about the repository. These notes may only be visible to an administrator. |
| Include and Exclude Patterns | See similar example configurations for a remote repository |
| Aggregated repositories | A list of repositories that may be aggregated by the virtual repository |
| Default deployment repo | A default local repository where content may be stored when uploaded to the virtual repository |

Additional nonlimiting example repository data structure and implementation details (e.g., in JSON format) describing different repository types are provided in Tables 5-7.

TABLE 5

```
{ //Repository 1
  "type":"remote",
  "key":"ml-remote",
  "packageType":"ml", # Different package types may be listed here, depends on the technology / API / implementation of handling the specific technology, protocol, metadata and data used in the repository
  "baseConfig":{
    "description":"",
    "notes":"",
    "repoLayoutRef":"simple-default",
    "includesPattern":"**/*",
    "excludesPattern":""
  },
  "repoTypeConfig":{
    "archiveBrowsingEnabled":false,
    "blackedOut":false,
    "propertySetRefs":[
      "$PRE_DEFINED_PROPERTY_SET"
    ],
    "allowAnyHostAuth":false,
    "blockMismatchingMimeTypes":true,
    "mismatchingMimeTypesOverrideList":"",
    "bypassHeadRequests":false,
    "disableUrlNormalization":false,
    "enableCookieManagement":false,
    "enableTokenAuthentication":true,
    "propagateQueryParams":false,
    "shareConfiguration":false,
    "listRemoteFolderItems":false,
    "synchronizeProperties":false,
    "contentSynchronisation":{
      "enabled":false,
      "statistics":{
        "enabled":false
      },
      "properties":{
        "enabled":false
      },
      "source":{
        "originAbsenceDetection":false
      }
    },
    "disableProxy":false,
    "storeArtifactsLocally":true,
    "url":"$ML-REPOSITORY-URL",
    "hardFail":false,
    "offline":false,
    "retrievalCachePeriodSecs":7200,
    "metadataRetrievalTimeoutSecs":60,
    "assumedOfflinePeriodSecs":300,
    "missedRetrievalCachePeriodSecs":1800,
    "checksumPolicyType":"generate-if-absent",
    "unusedArtifactsCleanupPeriodHours":0,
    "socketTimeoutMillis":15000,
    "priorityResolution":false,
    "handleReleases":true,
    "handleSnapshots":true,
```

TABLE 5-continued

```
    "sendContext":false,
    "curated":false,
    "maxUniqueSnapshots":0,
    "retrieveSha256FromServer":false
  },
  "packageTypeConfig":{
    # Specific technology/remote-server configuration may be available here },
  "securityConfig":{
    "hideUnauthorizedResources":false,
    "signedUrlTtl":90
  },
  "repoType":"REMOTE",
  "proxyDisabled":false
}
```

TABLE 6

```
{//Repository 2
  "type":"local",
  "key":"ml-local",
  "packageType":"ml", # Different package types may be listed here, depends on the technology /
API / implementation of handling the specific technology, protocol, metadata and data used in the
repository
  "baseConfig":{
    "description":"",
    "notes":"",
    "repoLayoutRef":"$NAME_OF_PREDEFINED_LAYOUT",
    "includesPattern":"**/*",
    "excludesPattern":""
  },
  "repoTypeConfig":{
    "archiveBrowsingEnabled":false,
    "blackedOut":false,
    "propertySetRefs":[
      "default"
    ],
    "checksumPolicyType":"client-checksums",
    "priorityResolution":false,
    "maxUniqueSnapshots":0,
    "handleReleases":true,
    "handleSnapshots":true,
    "snapshotVersionBehavior":"unique"
  },
  "packageTypeConfig":{
    # Specific technology/remote-server configuration may be available here
  },
  "securityConfig":{
    "hideUnauthorizedResources":false,
    "signedUrlTtl":90
  },
  "repoType":"LOCAL"
}
```

TABLE 7

```
{ //Repository 3
  "type":"virtual",
  "key":"prj1-ml-virtual",
  "packageType":"generic", # Different package types may be listed here, depends on the
technology / API / implementation of handling the specific technology, protocol, metadata and
data used in the repository
  "baseConfig":{
    "modelVersion":2,
    "description":"",
    "notes":"",
    "repoLayoutRef":"simple-default",
    "includesPattern":"**/*",
    "excludesPattern":""
  },
  "repoTypeConfig":{
    "artifactoryRequestsCanRetrieveRemoteArtifacts":false,
```

TABLE 7-continued

```
    "virtualCacheConfig":{
      "virtualRetrievalCachePeriodSecs":600
    },
    "repositoryRefs":[
      "${FIRST_LOCAL_REPOSITORY_NAME}",
      "${SECOND_LOCAL_REPOSITORY_NAME}",
      "${REMOTE_REPOSITORY_NAME}"
    ]
  },
  "packageTypeConfig":{
    # Specific technology/remote-server configuration may be available here
  },
  "securityConfig":{
    "hideUnauthorizedResources":false,
    "signedUrlTtl":90
  },
  "repoType":"VIRTUAL"
}
```

Additional nonlimiting examples and implementation details may include, for example:

Information and metadata: a system/user may initiate a model download request with a given library (which may be referred to, for example as "HF library"), e.g., snapshot_download (repo_id="my_model"), the HF library or client may query a specific API to get the model information and list of files, so it may download them according to a specific sha—such as for example commit or version of the model. The client may query a URL such as for example: /api/my_model/hf-remote/models/ . . . /my_model/revision/main. As not all users may be specifying a specific version/commit, the server may respond to this API call with JSON content, including the sha (version) of the model current/latest version. To do that, the server may query the remote server from time to time (based on expiration) and check whether there is a new version of the model by checking if this API response content, headers, or any other relevant metadata about the model or the model files was changed. Different procedures or implementation details, APIs, and the like, may be used in different remote repositories. The server may first query the remote server and try to get or fetch metadata, commonly with HEAD request first, and only if the content is not yet stored in the server, or newer than the content already in the server, the server may cache or store the new content as a new version.

Cache missing state: when the server attempts to download and store model or generally files from a remote server or repository, it may first check if the files are already stored, or if were stored and/or expired, and based on that, determine whether to search for the model/files, or a newer version of the expired model/files on the remote server or repository. The server (downloader) may accordingly attempt to query (submit HEAD/GET) the relevant files/call APIs to check if the content exists. If the content is missing (i.e. user provided a wrong model name/version), the downloader may cache the UNFOUND status for the specific model/file, and future requests for the same model/files to the downloader won't trigger again additional calls to the remote server as the downloader may check for its UNFOUND entry in the cache for every file it needs to query in the remote server, e.g., until the in-memory cache is expired, which may be a predefined duration valid which may be configurable by the repository administrator, see, e.g., "Missed Retrieval Cache Period" configuration for a remote repository.

Communication is unstable: a repository which may not be accessible to the server may be put in an "offline" mode for 300 seconds (which may be configurable, see, e.g., "Assumed Offline Period" for remote repository configurations) before checking connectivity to this remote server again. The "offline" may be stored or saved in memory state, so future requests to the remote repository may not go out and may be served from the existing cache (or storage) only. When a repository is set to an offline state, a dedicated scheduler may recheck the connectivity based on the Assumed Offline Period, with maximum exponential delay with a predefined limit or threshold. Once the repository is accessible again, the "offline" in memory state may be removed and requests may be propagated to the remote server or repository.

Figure 8:
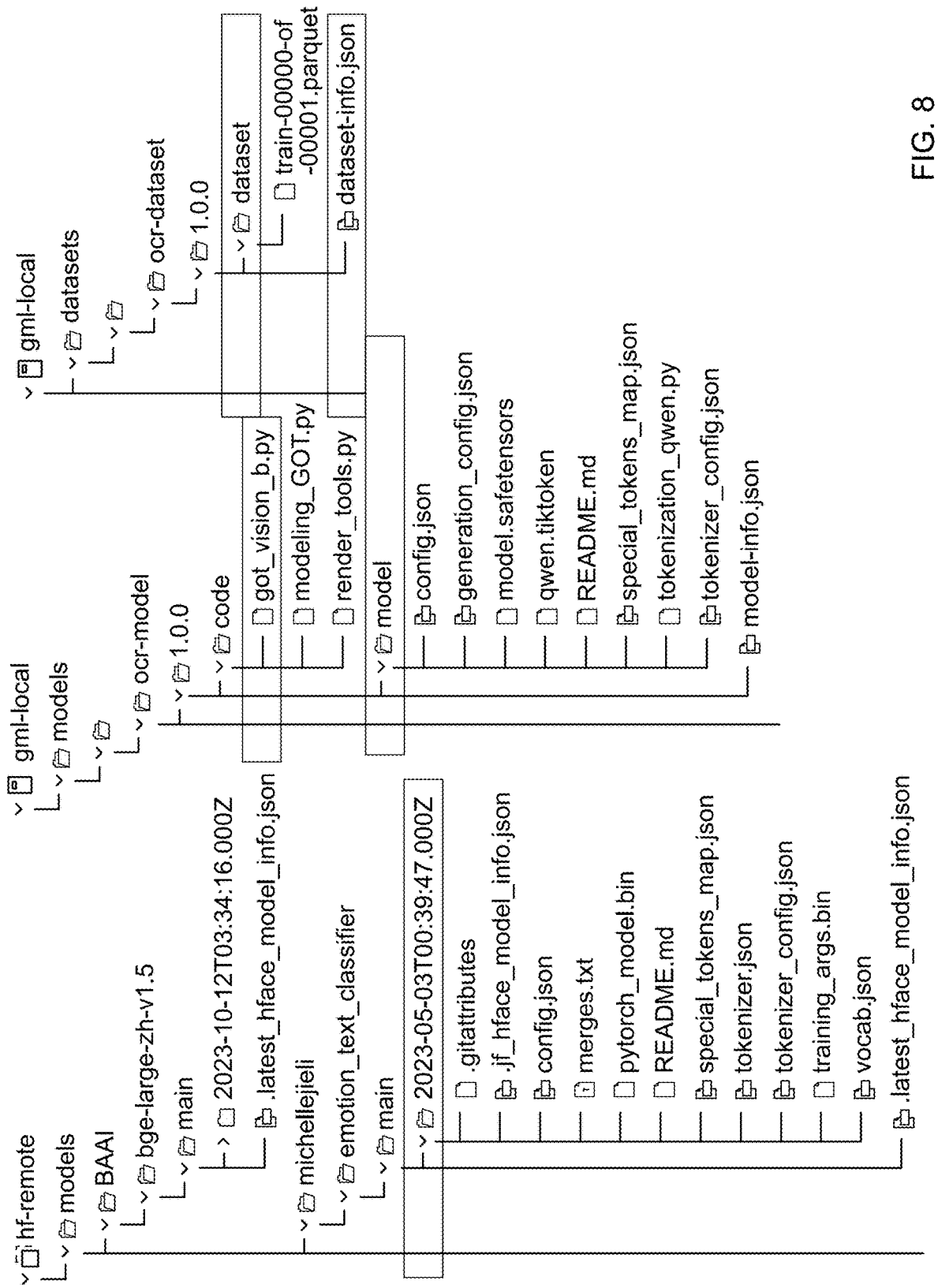
FIG. 8 shows an example use of repository coordinates/layout according to some embodiments of the invention.

FIG. 8 shows an example use of repository coordinates/layout according to some embodiments of the invention. Models requested by a client without specifying a specific version may automatically be translated to a "main" branch request. The server may take the current snapshot of the files at the time of requesting the model and may create a date directory under the "main" directory which may be used from now on when requesting "main" or when specifying no version (unless, e.g., it is considered as expired so newer content may be cached or stored under a new date). A layout configuration object, including relevant regular expressions (regex), may be provided as a default and/or clients may maintain their own layout manually.

Nonlimiting example JSON files representing virtual repository and priority resolution configurations are provided in Table 8.

TABLE 8

```
{
  "type":"virtual",
  "key":"ml-virtual",
  "packageType":"...", # The technology type,
  "baseConfig":{
```

TABLE 8-continued

```
    "modelVersion":2,
    "description":"",
    "notes":"",
    "repoLayoutRef":"....", # Default layout object, usually automatically defined
    "includesPattern":"**/*",
    "excludesPattern":""
},
"repoTypeConfig":{
    "defaultDeploymentRepoRef":"maven-local", # The default repository for upload
    "RequestsCanRetrieveRemoteArtifacts":false,
    "virtualCacheConfig":{
        "virtualRetrievalCachePeriodSecs":600
    },
    "repositoryRefs":[
        "myrepo-local-2",
        "myrepo-local",
        "repo-remote"
    ]
},
"packageTypeConfig":{
    ... # Optionally, specific technology (package-type) configurations
},
"securityConfig":{
    "hideUnauthorizedResources":false,
    "signedUrlTtl":90
},
"repoType":"VIRTUAL
```

Some example configuration keys in Table 8 include, e.g.:
defaultDeploymentRepoRef, which may be points on the default repository to upload content when uploading against the virtual repository
repositoryRefs, which may be a list of aggregated repositories, e.g., as ordered by an administrator.

An example request to the virtual repository may behave as follows:

If the requested resource is an index file/API, the virtual repository may merge the metadata (list of models/versions) from all the aggregated repositories, or repositories aggregated in the virtual repository. The repository index may reflect the "latest" version of the repository or files according to the user permissions, e.g., in case a user has limited permissions to see only part of the content in one or more of the repositories.

If the requested resource is a file (i.e. model pkl file), the repository may serve or use the file from the first found match of the repositoryRefs order, while the order of resolution may be, e.g.: 1. local repositories; 2. remote cache; 3. remote storage . . . and the like. Different memory hierarchies and management schemes or frameworks may be used in different embodiments.

If, e.g., one of the aggregated repositories is configured as with the priority resolution config, the server may prioritize searching for the packages in the repositories with that configuration, e.g., to avoid security threats such as for example namespace shadowing attacks where an attacker can fake a version of an internal package and publish it to a public server. The server may include or use various proxying techniques. An example JSON file representing a local repository that may enforce such configurations is provided in Table 9.

TABLE 9

```
{
    "type":"local",
    "key":"myrepo-local",
    "packageType":"...",
    "baseConfig":{
```

TABLE 9-continued

```
        "modelVersion":2,
        "description":"",
        "notes":"",
        "repoLayoutRef":"example-layout",
        "includesPattern":"**/*",
        "excludesPattern":""
    },
    "repoTypeConfig":{
        "archiveBrowsingEnabled":false,
        "blackedOut":false,
        "cdnRedirectRepoConfig":{
            "enabled":false
        },
        "downloadRedirectConfig":{
            "enabled":false
        },
        "propertySetRefs":[
            "default"
        ],
        "checksumPolicyType":"client-checksums",
        "priorityResolution":true,
        "maxUniqueSnapshots":0,
        "handleReleases":true,
        "handleSnapshots":true,
        "snapshotVersionBehavior":"unique"
    },
    "packageTypeConfig":{
        ... # Optionally, specific technology (package-type) configurations
    },
    "securityConfig":{
        "hideUnauthorizedResources":false,
        "signedUrlTtl":90
    },
    "repoType":"LOCAL"
}
```

Additional or alternative example data structures and repository files and/or configurations may be used in different embodiments of the invention.

What is claimed is:

1. A method for managing computer model repositories, the method performed by a server comprising a computer processor, the method comprising:
   aggregating a plurality of repositories, each of the plurality of repositories comprising one or more model data elements of a machine learning model, wherein the plurality of repositories include: a remote repository, and a local repository, wherein the remote repository is comprised in a first computer system, the first computer system geographically separated from the server;

wherein the aggregating of the plurality of repositories comprises:
  proxying, in the local repository, one or more model data elements from the remote repository, wherein the proxying comprises strategically storing, at the server, one or more of the model data elements from the remote repository in a cache; and
  associating a single address with: the remote repository, and the local repository;

in response to a command comprising the single address, the command received from a second computer system, the second computer system geographically separated from the server:
  determining a state for the machine learning model, wherein the determining of the state comprises comparing a version of the machine learning model stored in the local repository to a reference version of the machine learning model stored in the remote repository, the comparing using at least one of: a checksum operation, a model commit, and a hash function, wherein the version of the machine learning model stored in the local repository comprises one or more of the proxied model data elements; and
  fetching one or more of the model data elements based on the determined state, wherein the fetching of one or more of the model data comprises transmitting one or more of the model data elements to the second computer system;

wherein the command received from the second computer system is a request for a version of the machine learning model made to the single address, wherein the server checks for the requested version in the remote repository, and for a requested version existing in the remote repository:
  validating the requested version existing in the remote repository; and
  retrieving one or more model data elements of the requested version from the remote repository and storing the one or more retrieved model data elements in the cache;

wherein the fetching of the one or more model data elements comprises transmitting one or more of the model data elements retrieved from the remote repository and stored in the cache to the second computer system.

2. The method of claim 1, comprising, by the server: performing a first validation that the second computer system is permitted to: perform download operations, or populate the cache; and
performing a second validation that one or more of the model data elements of the requested version of the machine learning model do not violate a plurality of policies;
wherein the fetching of the one or more model data elements is performed based on: the first validation and the second validation.

3. The method of claim 1, wherein the fetching of the one or more model data elements comprises: fetching one or more of the model data elements of the requested version of the machine learning model from the local repository instead of from the remote repository.

4. The method of claim 1, wherein the server interacts with the remote repository based on a plurality of repository configurations, the plurality of repository configurations comprising one or more of: network parameters, authentication details, and caching configurations.

5. The method of claim 1, wherein the determining of the state for the machine learning model comprises expiring one or more of the model data elements cached for more than a predetermined time period; and
wherein the fetching of the one or more model data elements comprises replacing one or more of the expired model data elements with new model data elements from the remote repository.

6. The method of claim 1, wherein the determining of the state for the machine learning model comprises storing a response from an application programming interface (API) of the remote repository in at least one file representing the version of the machine learning model stored in the local repository.

7. The method of claim 1, comprising: if the reference version of the model is unavailable over a predetermined time period, preventing the comparing of the version of the machine learning model stored in the local repository to the reference version of the machine learning model stored in the remote repository.

8. The method of claim 1, comprising: creating a version of the machine learning model, the created version comprising one or more of the model data elements of the requested version of the machine learning model retrieved from the remote repository and stored in the cache.

9. The method of claim 1, wherein one or more of the fetched model data elements is a model binary file.

10. A system for managing computer model repositories, the system comprising:
  a server comprising a memory; and
  a processor configured to:
    aggregate a plurality of repositories, each of the plurality of repositories comprising one or more model data elements of a machine learning model, wherein the plurality of repositories include: a remote repository, and a local repository, wherein the remote repository is comprised in a first computer system, the first computer system geographically separated from the server;
    wherein the aggregating of the plurality of repositories comprises:
      proxying, in the local repository, one or more model data elements from the remote repository, wherein the proxying comprises strategically storing, at the server, one or more of the model data elements from the remote repository in a cache; and
      associating a single address with: the remote repository, and the local repository;
    in response to a command comprising the single address, the command received from a second computer system, the second computer system geographically separated from the server:
      determine a state for the machine learning model, wherein the determining of the state comprises comparing a version of the machine learning model stored in the local repository to a reference version of the machine learning model stored in the remote repository, the comparing using at least one of: a checksum operation, a model commit, and a hash function, wherein the version of the machine learning model stored in the local repository comprises one or more of the proxied model data elements; and fetch one or more of the model data elements based on the determined state, wherein the fetching of one or more of the model data comprises transmitting one or more of the model data elements to the second computer system;

wherein the command received from the second computer system is a request for a version of the machine learning model made to the single address, wherein the server checks for the requested version in the remote repository, and wherein the processor is configured to, for a requested version existing in the remote repository:

validate the requested version existing in the remote repository; and retrieve one or more model data elements of the requested version from the remote repository and store the one or more retrieved model data elements in the cache;

wherein the fetching of the one or more model data elements comprises transmitting one or more of the model data elements retrieved from the remote repository and stored in the cache to the second computer system.

11. The system of claim 10, wherein the processor is to:
perform a first validation that the second computer system is permitted to: perform download operations, or populate the cache; and
perform a second validation that one or more of the model data elements of the requested version of the machine learning model do not violate a plurality of policies;
wherein the fetching of the one or more model data elements is performed based on: the first validation and the second validation.

12. The system of claim 10, wherein the fetching of the one or more model data elements comprises: fetching one or more of the model data elements of the requested version of the machine learning model from the local repository instead of from the remote repository.

13. The system of claim 10, wherein the processor is to interact with the remote repository based on a plurality of repository configurations, the plurality of repository configurations comprising one or more of: network parameters, authentication details, and caching configurations.

14. The system of claim 10, wherein the determining of the state for the machine learning model comprises expiring one or more of the model data elements cached for more than a predetermined time period; and
wherein the fetching of the one or more model data elements comprises replacing one or more of the expired model data elements with new model data elements from the remote repository.

15. The system of claim 10, wherein the determining of the state for the machine learning model comprises storing a response from an application programming interface (API) of the remote repository in at least one file representing the version of the machine learning model stored in the local repository.

16. The system of claim 10, wherein the processor is to: if the reference version of the model is unavailable over a predetermined time period, prevent the comparing of the version of the machine learning model stored in the local repository to the reference version of the machine learning model stored in the remote repository.

17. The system of claim 10, wherein the processor is to create a version of the machine learning model, the created version comprising one or more of the model data elements of the requested version of the machine learning model retrieved from the remote repository and stored in the cache.

18. The system of claim 10, wherein one or more of the fetched model data elements is a model binary file.

* * * * *